(12) United States Patent
Tomiyama

(10) Patent No.: US 9,945,444 B2
(45) Date of Patent: Apr. 17, 2018

(54) LOCK-UP DEVICE

(71) Applicant: EXEDY Corporation, Neyagawa-shi, Osaka (JP)

(72) Inventor: Naoki Tomiyama, Neyagawa (JP)

(73) Assignee: EXEDY Corporation, Osaka (JP)

( * ) Notice: Subject to any disclaimer, the term of this patent is extended or adjusted under 35 U.S.C. 154(b) by 493 days.

(21) Appl. No.: 14/428,679

(22) PCT Filed: Nov. 20, 2013

(86) PCT No.: PCT/JP2013/081295
§ 371 (c)(1),
(2) Date: Mar. 17, 2015

(87) PCT Pub. No.: WO2014/084100
PCT Pub. Date: Jun. 5, 2014

(65) Prior Publication Data
US 2015/0247550 A1    Sep. 3, 2015

(30) Foreign Application Priority Data

Nov. 27, 2012 (JP) ................................. 2012-258910

(51) Int. Cl.
*F16F 15/123* (2006.01)
*F16F 15/133* (2006.01)
*F16H 45/02* (2006.01)
*F16F 15/134* (2006.01)

(52) U.S. Cl.
CPC .... *F16F 15/1338* (2013.01); *F16F 15/12346* (2013.01); *F16F 15/12373* (2013.01); *F16F 15/13461* (2013.01); *F16F 15/13492* (2013.01); *F16H 45/02* (2013.01)

(58) Field of Classification Search
CPC .......... F16F 15/12346; F16F 15/12373; F16F 15/1338; F16F 15/13461; F16F 15/13492; F16H 45/02; F16H 2045/0231
USPC ............................................... 464/68.1, 68.9
See application file for complete search history.

(56) References Cited

U.S. PATENT DOCUMENTS 3,380,566 A *   4/1968  Cook ................ F16F 15/12373
                                                    192/213
8,752,685 B2 *  6/2014  Tomiyama ............... F16D 3/14
                                                    192/213

FOREIGN PATENT DOCUMENTS

| JP | 58196324 A | * | 11/1983 | ........ F16F 15/12313 |
| JP | 2000-310282 A | | 11/2000 | |
| JP | 2009-243599 A | | 10/2009 | |
| JP | 2010-216499 A | | 9/2010 | |
| JP | 2011-179515 A | | 9/2011 | |
| JP | 2012-219999 A | | 11/2012 | |

(Continued)

OTHER PUBLICATIONS

Translation of JP 2000-310282. Uehara, et al. Damper Disc Assembly. Nov. 7, 2000.*

*Primary Examiner* — Josh Skroupa

(57) ABSTRACT

A lock-up device includes a drive plate, a driven plate, first torsion springs, second torsion springs, a spring holder and a rotation restricting unit. The rotation restricting unit is configured to restrict and bring the first torsion spring in each group and the second torsion spring in each group to a deactivated state by at least either of engagement of the spring holder with the driven plate or engagement of the drive plate with the spring holder.

10 Claims, 13 Drawing Sheets

(56) References Cited

FOREIGN PATENT DOCUMENTS

WO     WO 2011105182 A1 *   9/2011   ............... F16D 3/14

* cited by examiner

LOCK-UP DEVICE

CROSS-REFERENCE TO RELATED APPLICATIONS

This application is a U.S. National stage application of International Application No. PCT/JP2013/081295, filed Nov. 20, 2013, which claims priority to Japanese Patent Application No. 2012-258910, filed in Japan on Nov. 27, 2012, the entire content of which is hereby incorporated by reference.

BACKGROUND

Field of Invention

The present invention relates to a lock-up device, particularly to a lock-up device for transmitting torque and for absorbing and attenuating torsional vibration.

Background Art

Various devices are installed in a drivetrain of a vehicle to transmit power generated in an engine. A lock-up device can be exemplified as this type of device. A vibration reducing mechanism is used for this type of device to attenuate vibration (see e.g., Japan Laid-open Patent Application Publication No. JP-A-2011-179515).

First, in the vibration reducing mechanism, when each pair of first coil springs begins to be compressed, torsional vibration is absorbed and attenuated in accordance with torsional stiffness of each pair of first coil springs (a first stage torsional characteristic). Next, when each pair of first coil springs and each pair of second coil springs begin to be compressed, torsional vibration is absorbed and attenuated in accordance with torsional stiffness of each pair of first coil springs and each pair of second coil springs (a second stage torsional characteristic). Finally, when coiled parts of one of each pair of second coil springs are closely contacted in a condition that each pair of first coil springs and each pair of second coil springs are compressed, torsional vibration is absorbed and attenuated in accordance with torsional stiffness of the first coil springs and the other second coil spring that are still compressible (a third stage torsional characteristic).

SUMMARY

Technical Problems

In the well-known lock-up device, multistage torsional characteristics are formed by causing the coiled parts of the second coil springs to be closely contacted. The lock-up device is configured to be activated in the condition that the coiled parts of the second coil springs are closely contacted. Accordingly, in each second coil spring that the coiled parts thereof are closely contacted, chances are that the coil spring wire thereof is displaced in a direction separating from a coil spring axis, a direction approaching to the coil spring axis, or so forth. This may result in that the displaced part of the wire makes contact with or slides against the inner periphery of the relevant first coil spring and thereby abrades the inner periphery of the relevant first coil spring. Put differently, chances are that durability of the relevant first coil spring degrades.

Further, when the lock-up device is activated in the condition that the coiled parts of the second coil springs are closely contacted, chances are that the end of each second coil spring of the closely contacted state moves onto the outer periphery of the receiver part of a spring sheet. This may result in damage or breakage of the ends of the second coil springs. Put differently, chances are that durability of the second coil springs degrades. It should be noted that the aforementioned receiver part of each spring sheet is, for instance, a part protruding from the end of the coiled parts of the relevant first coil spring into the inner periphery of the relevant first coil spring.

It should be noted that the example herein described relates to the configuration that the coiled parts of the second coil springs are configured to be closely contacted under the third stage torsional characteristic. However, a drawback similar to the above is also caused even in configurations that the coiled parts of the second coil springs are configured to be closely contacted in the first stage torsional characteristic and in the second stage torsional characteristic.

The present invention has been produced in view of the aforementioned drawback. It is an object of the present invention to provide a lock-up device whereby durability of elastic members can be enhanced.

Solution to Problems

A lock-up device according to an exemplary embodiment of the present invention is a device for transmitting torque and for absorbing and attenuating torsional vibration. The lock-up device includes an input rotary member, an output rotary member, a plurality of groups of first elastic members, second elastic members, a float member and an activation restricting mechanism. The output rotary member is disposed to be rotatable with respect to the input rotary member. The plurality of groups of first elastic members are configured to be circumferentially compressed by relative rotation between the input rotary member and the output rotary member. When described in detail, the first elastic members in each group are configured to be circumferentially compressed in series by relative rotation between the input rotary member and the output rotary member. The second elastic members respectively have a free length shorter than a free length of the first elastic members. The second elastic members are respectively disposed in inner peripheral parts of the first elastic members. The float member restricts radial movement of the plurality of groups of the first elastic members.

The activation restricting mechanism is configured to restrict and bring one of the first elastic members in each group and the second elastic member disposed in the inner peripheral part of the one of the first elastic members in each group to a deactivated state by at least either of engagement of the float member with the output rotary member and engagement of the input rotary member with the float member.

In the exemplary embodiment of the lock-up device, for instance, when power of the engine is inputted into the input rotary member, the first elastic members in each group firstly begin to be compressed in accordance with the torsion angle (rotational amount) of the input rotary member with respect to the output rotary member. Accordingly, the torsional vibration is absorbed and attenuated in accordance with the torsional stiffness of the first elastic members in each group (first stage torsional characteristic). Next, when the first elastic members in each group and the second elastic members in each group begin to be compressed, the torsional vibration is absorbed and attenuated in accordance with the torsional stiffness of the first elastic members in each group and the second elastic members in each group (second stage torsional characteristic). Subsequently, the one of the first elastic members and the second elastic member disposed in the inner peripheral part of the one of the first elastic members are restricted and brought to the deactivated state by the activation restricting mechanism (first activation restriction). Then, the torsional vibration is absorbed and attenuated in accordance with the torsional stiffness of the other of the first elastic members in each group and that of the second elastic member disposed in the inner peripheral part of the other of the first elastic members in each group (third stage torsional characteristic).

In the exemplary embodiment of the lock-up device, the activation restricting mechanism is configured to restrict and bring the one of the first elastic members and the second elastic member disposed in the inner peripheral part of the one of the first elastic members to the deactivated state by at least either of the engagement of the float member with the output rotary member and the engagement of the input rotary member with the float member. Put differently, in the exemplary embodiment of the lock-up device, multistage torsional characteristics, for instance, three stage torsional characteristics, are formed without causing coiled parts of the elastic members to be closely contacted. Thus, the exemplary embodiment of the lock-up device can solve a drawback as described above and can enhance durability of the elastic members. Moreover, the lock-up device can flexibly set a bent point between the second stage torsional characteristic and the third stage torsional characteristic. In other words, the lock-up device can enhance flexibility in designing of multistage characteristics without causing a drawback as described above.

The float member can be configured to be engaged with the output rotary member when the input rotary member is rotated in a first direction. In the activation restricting mechanism, the input rotary member can be configured to be engaged with the float member when the input rotary member is rotated in a second direction oriented oppositely to the first direction.

According to the exemplary embodiment of the lock-up device, for instance, when the input rotary member is rotated in the first direction under the third stage torsional characteristic, the one of the first elastic members and the second elastic member disposed in the inner peripheral part of the one of the first elastic members are restricted and brought to the deactivated state by causing the float member to be engaged with the output rotary member (e.g., positive-side first activation restriction). When the input rotary member is rotated in the second direction oriented oppositely to the first direction under the third stage torsional characteristic, the one of the first elastic members and the second elastic member disposed in the inner peripheral part of the one of the first elastic members are restricted and brought to the deactivated state by causing the input rotary member to be engaged with the float member (e.g., negative-side first activation restriction).

Thus, even when the first elastic members in each group have different magnitudes of stiffness, the one of the first elastic members and the second elastic member disposed in the inner peripheral part of the one of the first elastic members can be restricted and brought to the deactivated state. Further, even when the second elastic members in each group have different magnitudes of stiffness, the one of the first elastic members and the second elastic member disposed in the inner peripheral part of the one of the first elastic members can be restricted and brought to the deactivated state.

The activation restricting mechanism is configured to restrict and bring the other of the first elastic members in each group and the second elastic member disposed in the inner peripheral part of the other of the first elastic members in each group to the deactivated state by engagement of the input rotary member with the output rotary member after restricting and bringing the one of the first elastic members in each group and the second elastic member disposed in the inner peripheral part of the one of the first elastic members in each group to the deactivated state.

According to the exemplary embodiment of the lock-up device, for instance, under the third torsional characteristic, the other of the first elastic members in each group and the second elastic member disposed in the inner peripheral part of the other of the first elastic members are restricted and brought to the deactivated state by the engagement of the input rotary member with the output rotary member (second activation restriction). Accordingly, the upper limit of the third stage torsional characteristic is set. Thus, the present lock-up device can flexibly set the upper limit of the multistage torsional characteristics without causing the coiled parts of the elastic members to be closely contacted. In other words, the present lock-up device can enhance flexibility in designing of multistage characteristics without causing a drawback as described above.

The float member can have a first engaging part formed to face the output rotary member. The output rotary member has a first contact part with which the first engaging part makes contact. The activation restricting mechanism is configured to restrict and bring the one of the first elastic members and the second elastic member disposed in the inner peripheral part of the one of the first elastic members to the deactivated state by causing the first engaging part to make contact with the first contact part.

According to the exemplary embodiment of the lock-up device, for the purpose of enabling function of the activation restricting mechanism (first activation restriction), the first engaging part is prepared for the float member whereas the first contact part is prepared for the output rotary member. With a thus constructed lock-up device, the activation restricting mechanism can be activated without greatly modifying the device construction. Put differently, the aforementioned advantageous effect can be obtained without increasing the number of components.

The input rotary member can have a second engaging part formed to face the output rotary member. The output rotary member has a second contact part with which the second engaging part makes contact. The activation restricting mechanism is configured to restrict and bring the other of the first elastic members in each group and the second elastic member disposed in the inner peripheral part of the other of the first elastic members to the deactivated state by causing the second engaging part to make contact with the second contact part after restricting and bringing the one of the first elastic members and the second elastic member disposed in the inner peripheral part of the one of the first elastic members to the deactivated state.

According to the exemplary embodiment of the lock-up device, for the purpose of enabling function of the activation restricting mechanism (second activation restriction), the second engaging part is prepared for the input rotary member whereas the second contact part is prepared for the output rotary member. With a thus constructed lock-up device, the activation restricting mechanism can be activated without greatly modifying the device construction. Put differently, the aforementioned advantageous effect can be obtained without increasing the number of components.

The second engaging part is configured to be disposed circumferentially between the first engaging part and the second contact part in a condition that the first engaging part makes contact with the first contact part. With a thus constructed lock-up device, the activation restricting mechanism is capable of reliably performing the second activation restriction after performing the first activation restriction.

The input rotary member can have a third engaging part formed to face the float member. The float member has a third contact part with which the third engaging part makes contact. The activation restricting mechanism is configured to restrict and bring the one of the first elastic members and the second elastic member disposed in the inner peripheral part of the one of the first elastic members to the deactivated state by causing the third engaging part to make contact with the third contact part.

According to the exemplary embodiment of the lock-up device, for the purpose of enabling function of the activation restricting mechanism (first activation restriction), the third engaging part is prepared for the input rotary member whereas the third contact part is prepared for the float member. With a thus constructed lock-up device, the activation restricting mechanism can be activated without greatly modifying the device construction. Put differently, the aforementioned advantageous effect can be obtained without increasing the number of components.

The input rotary member can have a fourth engaging part formed to face the output rotary member. The output rotary member has a fourth contact part with which the fourth engaging part makes contact. The activation restricting mechanism is configured to restrict and bring the other of the first elastic members in each group and the second elastic member disposed in the inner peripheral part of the other of the first elastic members to the deactivated state by causing the fourth engaging part to make contact with the fourth contact part after restricting and bringing the one of the first elastic members and the second elastic member disposed in the inner peripheral part of the one of the first elastic members to the deactivated state.

According to the exemplary embodiment of the lock-up device, for the purpose of enabling function of the activation restricting mechanism (second activation restriction), the fourth engaging part is prepared for the input rotary member whereas the fourth contact part is prepared for the output rotary member. With a thus constructed lock-up device, the activation restricting mechanism can be activated without greatly modifying the device construction. Put differently, the aforementioned advantageous effect can be obtained without increasing the number of components.

The fourth engaging part can be configured to be disposed circumferentially between the third engaging part and the fourth contact part in a condition that the third engaging part makes contact with the third contact part. With a thus constructed lock-up device, the activation restricting mechanism is capable of reliably performing the second activation restriction after performing the first activation restriction.

The second elastic member disposed in the inner peripheral part of the one of the first elastic members can exert a stiffness having a smaller magnitude than a stiffness to be exerted by the second elastic member disposed in the inner peripheral part of the other of the first elastic members in each group. Further, in the activation restricting mechanism, the float member is configured to be engaged with the output rotary member when the input rotary member is rotated in a first direction. In the activation restricting mechanism, the input rotary member is configured to be engaged with the float member when the input rotary member is rotated in a second direction oriented oppositely to the first direction.

According to the exemplary embodiment of the lock-up device, for instance, when the input rotary member is rotated in the first direction under the third stage torsional characteristic, the one of the first elastic members and the second elastic member disposed in the inner peripheral part of the one of the first elastic members are restricted and brought to the deactivated state by causing the float member to be engaged with the output rotary member (e.g., positive-side first activation restriction). On the other hand, when the input rotary member is rotated in the second direction oriented oppositely to the first direction under the third stage torsional characteristic, the one of the first elastic members and the second elastic member disposed in the inner peripheral part of the one of the first elastic members are restricted and brought to the deactivated state by causing the input rotary member to be engaged with the float member (e.g., negative-side first activation restriction).

Thus, even when the first elastic members in each group have different magnitudes of stiffness, the one of the first elastic members and the second elastic member disposed in the inner peripheral part of the one of the first elastic members can be restricted and brought to the deactivated state. Further, even when the second elastic members in each group have different magnitudes of stiffness, the one of the first elastic members and the second elastic member disposed in the inner peripheral part of the one of the first elastic members can be restricted and brought to the deactivated state.

According to exemplary embodiments of the present invention, it is possible to provide a lock-up device whereby durability of elastic members can be enhanced.

DETAILED DESCRIPTION OF THE EXEMPLARY EMBODIMENTS

Figure 1:
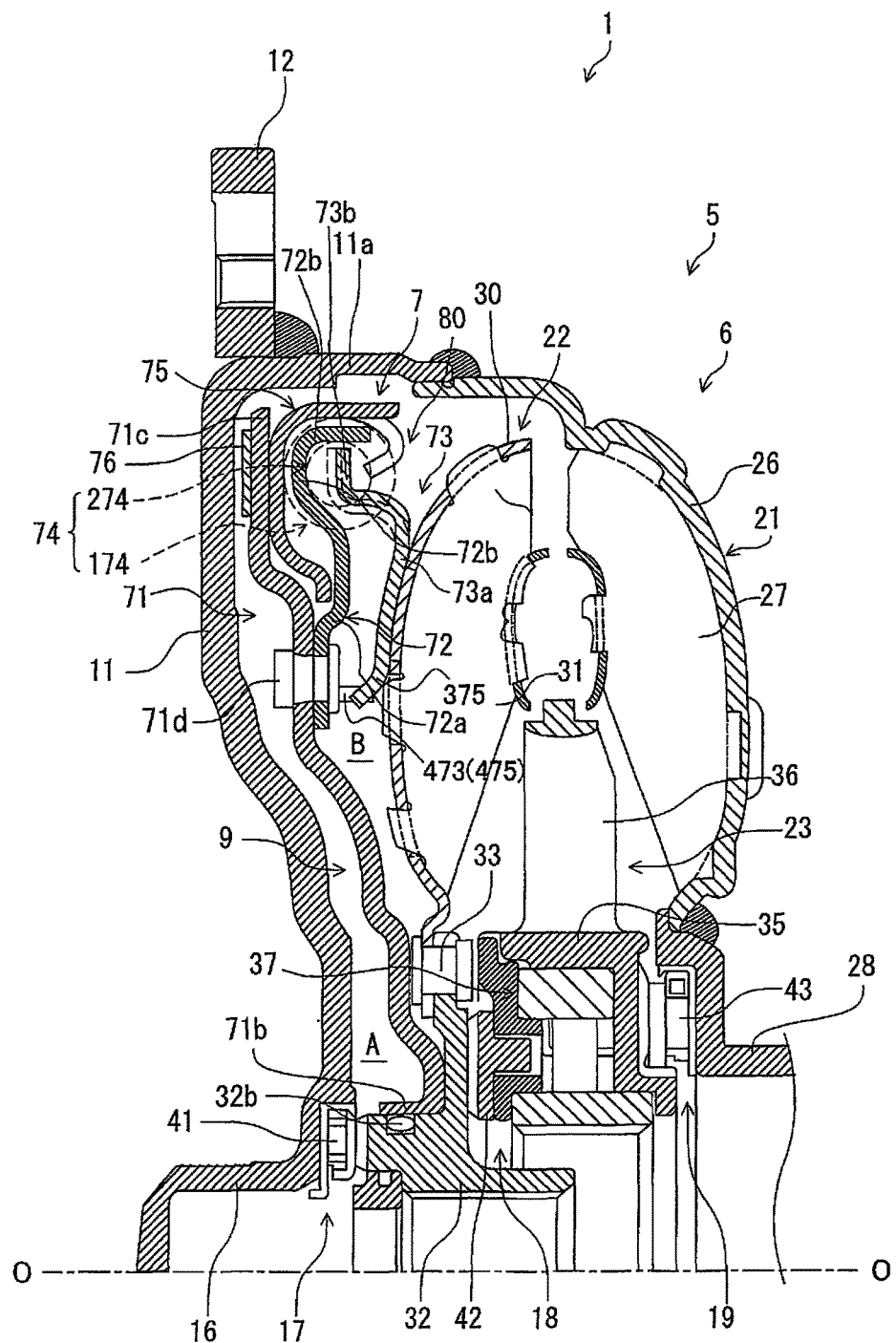
FIG. 1 is a partially cross-sectional view of a torque converter equipped with a lock-up device according to an exemplary embodiment of the present invention.

FIG. 1 is a partial cross-sectional view of a torque converter 1 employing a lock-up device according to an exemplary embodiment of the present invention. In FIG. 1, an engine (not shown in the drawings) is disposed on the left side, whereas a transmission (not shown in the drawings) is disposed on the right side. In FIG. 1, a line O-O indicates a rotational axis of the torque converter and the lock-up device.

[Entire Construction of Torque Converter]

FIG. 1 is a schematic view of a vertical cross-section of the torque converter 1 employing the exemplary embodiment of the present invention. The torque converter 1 is a device for transmitting torque from a crankshaft (not shown in the drawings) of the engine to an input shaft (not shown in the drawings) of the transmission. In FIG. 1, the engine (not shown in the drawings) is disposed on the left side, whereas the transmission (not shown in the drawings) is disposed on the right side. In FIG. 1, the line O-O indicates the rotational axis of the torque converter 1.

Figure 2:
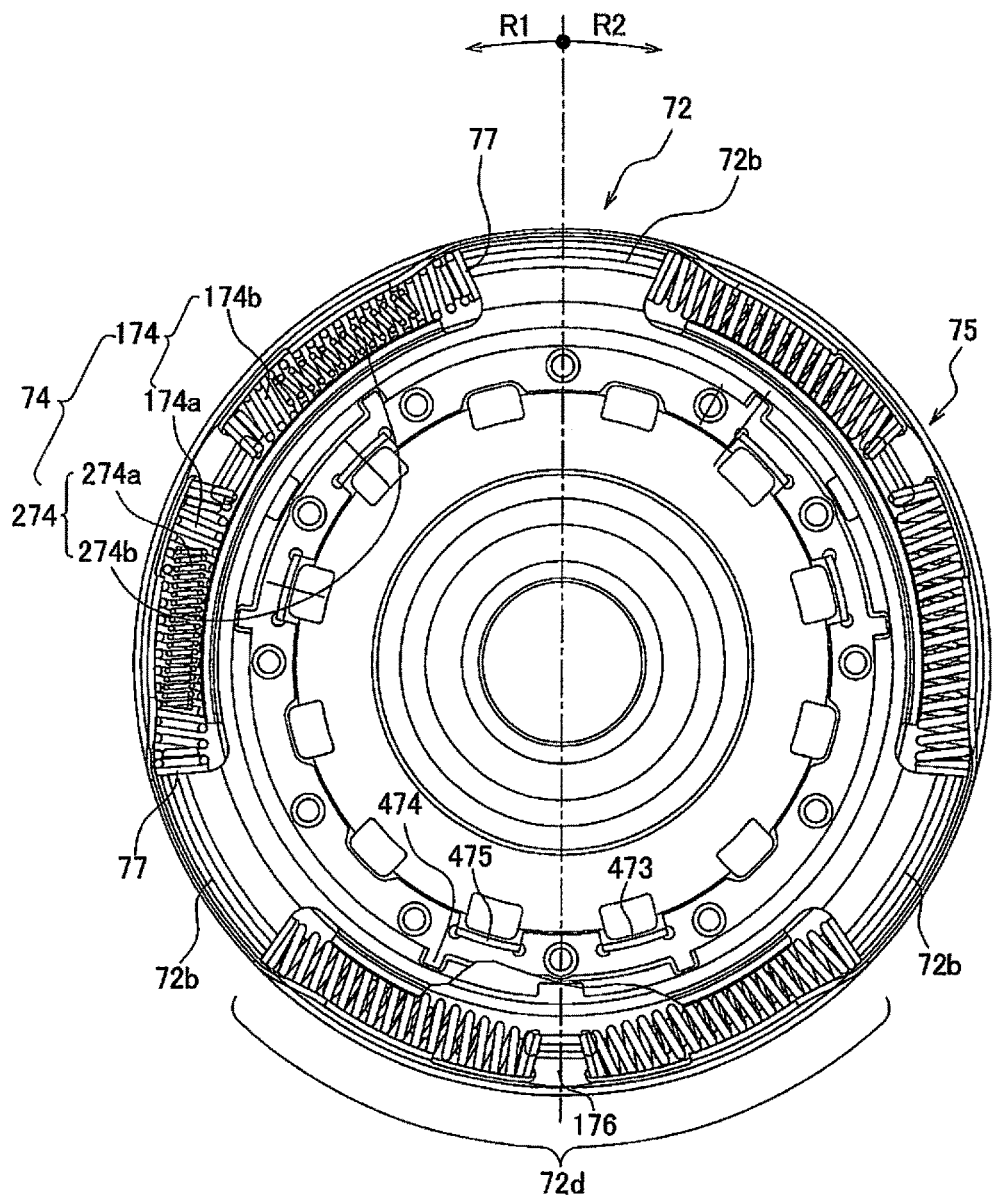
FIG. 2 is a front view of the lock-up device.

FIG. 2 is a front view of a lock-up device 7. In FIG. 2, reference signs 174 and 274 are only assigned to one group of first torsion springs 174 and second torsion springs 274. Also in FIG. 2, reference signs 77 are only assigned to one group of spring sheets 77. Further in FIG. 2, an arrow R1 indicates a rotation-directional drive side of the torque converter 1. In FIG. 2, an arrow R2 indicates the opposite side of the rotation-directional drive side. The rotational direction R1 is an exemplary "first direction", whereas the rotational direction R2 is an exemplary "second direction". It should be noted that in the present exemplary embodiment, the rotational direction R1 could be expressed as "a positive side", whereas the rotational direction R2 could be expressed as "a negative side".

As shown in FIG. 1, the torque converter 1 is mainly composed of a flexible plate (not shown in the drawings) and a torque converter body 5. The flexible plate is made of a thin member having a disc shape, and serves to transmit torque and absorb bending vibration to be transmitted from the crankshaft to the torque converter body 5. Thus, the flexible plate exerts stiffness enough to transmit torque in the rotational direction but exerts low stiffness in the bending direction.

The torque converter body 5 is composed of the lock-up device 7 and a torus-shaped fluid actuation chamber 6 formed by three types of vane wheels (an impeller 21, a turbine 22 and a stator 23).

A front cover 11 is a disc-shaped member and is disposed adjacently to the flexible plate. A center boss 16 is mounted to the inner peripheral end of the front cover 11. The center boss 16 is a cylindrical member extending in the axial direction, and is inserted into the center hole of the crankshaft.

The inner peripheral part of the flexible plate is fixed to the tip end surface of the crankshaft by a plurality of bolts. A plurality of nuts 12 are fixed to the outer peripheral side of the front cover 11. The plurality of nuts 12 are disposed to be circumferentially aligned at equal intervals. The outer peripheral part of the flexible plate is fixed to the front cover 11 by bolts screwed into the nuts 12.

An outer peripheral side tubular part 11a is formed as the outer peripheral part of the front cover 11, and extends axially toward the transmission. The outer peripheral edge of an impeller shell 26 of the impeller 21 is fixed to the tip end of the outer peripheral side tubular part 11a by welding. As a result, the front cover 11 and the impeller 21 form a fluid chamber that the interior thereof is filled with operating oil. The impeller 21 is mainly composed of the impeller shell 26, a plurality of impeller blades 27 fixed to the inside of the impeller shell 26, and an impeller hub 28 fixed to the inner peripheral part of the impeller shell 26.

The turbine 22 is disposed inside the fluid chamber to be axially opposed to the impeller 21. The turbine 22 is mainly composed of a turbine shell 30, a plurality of turbine blades 31 fixed to the impeller side surface of the turbine shell 30, and a turbine hub 32 fixed to the inner peripheral edge of the turbine shell 30. The turbine shell 30 and the turbine hub 32 are fixed by a plurality of rivets 33.

A spline is formed on the inner peripheral surface of the turbine hub 32 to be engaged with the input shaft. Thus, the turbine hub 32 is configured to be unitarily rotated with the input shaft.

The stator 23 is a mechanism for regulating the flow of the operating oil returning from the turbine 22 to the impeller 21. The stator 23 is integrally formed by casting of resin, aluminum alloy or so forth. The stator 23 is disposed between the inner peripheral part of the impeller 21 and that of the turbine 22. The stator 23 is mainly composed of an annular stator shell 35 and a plurality of stator blades 36 mounted to the outer peripheral surface of the shell 35. The stator shell 35 is supported by a tubular stationary shaft (not shown in the drawings) through a one-way clutch 37. The stationary shaft extends between the outer peripheral surface of the input shaft and the inner peripheral surface of the impeller hub 28.

The torus-shaped fluid actuation chamber 6 is formed by the respective shells 26, 30 and 35 of the aforementioned respective vane wheels 21, 22 and 23. It should be noted that an annular space 9 is reliably produced between the front cover 11 and the fluid actuation chamber 6.

The one-way clutch 37 shown in FIG. 1 has a structure using a ratchet, but may have a structure using rollers or sprags.

A first thrust bearing 41 is disposed axially between the inner peripheral part of the front cover 11 and the turbine hub 32. A first port 17 is formed in the part to which the first thrust bearing 41 is mounted, and enables the operating oil to radially pass therethrough. An oil path formed inside the input shaft, a first hydraulic chamber A (to be described), and a space produced between the turbine 22 and the front cover 11 are communicated through the first port 17.

Further, a thrust bushing 42 is disposed between the turbine hub 32 and the inner peripheral part of the stator 23 (specifically, the one-way clutch 37). A second port 18 is formed in the part to which the thrust bushing 42 is mounted, and enables the operating oil to radially pass therethrough to the both sides. In other words, the fluid actuation chamber 6 and an oil path produced between the input shaft and the stationary shaft are communicated through the second port 18.

Further, a second thrust bearing 43 is disposed axially between the stator 23 (specifically, the shell 35) and the impeller 21 (specifically, the impeller hub 28). A third port 19 is formed in the part to which the second thrust bearing 43 is mounted, and enables the operating oil to radially pass therethrough to the both sides. In other words, the fluid actuation chamber 6 and an oil path produced between the stationary shaft and the impeller hub 28 are communicated through the third port 19. It should be noted that the respective oil paths are connected to a hydraulic circuit (not shown in the drawings) and are capable of independently supplying/discharging the operating oil to/from the first to third ports 17 to 19.

Structure of Lock-Up Device

As shown in FIG. 1, the lock-up device 7 is disposed in the space 9 produced between the turbine 22 and the front cover 11. The lock-up device 7 is a mechanism for mechanically coupling the turbine 22 and the front cover 11 on an as-needed basis. The lock-up device 7 is disposed in the space produced axially between the front cover 11 and the turbine 22. The lock-up device 7 has an entirely disc shape, and divides the space 9 in a roughly axial direction. Here, the space produced between the front cover 11 and the lock-up device 7 is defined as the first hydraulic chamber A, whereas the space produced between the lock-up device 7 and the turbine 22 is defined as a second hydraulic chamber B.

The lock-up device 7 has a clutch function. Further, the lock-up device 7 has a function of reducing vibration (vibration reducing mechanism). When described in detail, the vibration reducing mechanism is a mechanism for attenuating vibration to be transmitted from the engine to the transmission.

The lock-up device 7 is mainly composed of a piston 71, a drive plate 72 (a retaining plate; an exemplary input rotary member), a driven plate 73 (an exemplary output rotary member), a plurality of groups of torsion springs 74 (exemplary first and second elastic members), a spring holder 75 (an exemplary float member) and a rotation restricting unit 80 (an exemplary activation restricting mechanism).

As shown in FIGS. 1 and 2, each group of the torsion springs 74 is configured to be rotation-directionally compressed by relative rotation between the drive plate 72 and the driven plate 73. When described in detail, each group of the torsion springs 74 is configured to be rotation-directionally compressed through the spring sheets 77 by the relative rotation between the drive plate 72 and the driven plate 73. One of each pair of the spring sheets 77 is disposed between one end of a first torsion spring 174b (to be described) and the drive plate 72. The other of each pair of the spring sheets 77 is disposed between one end of a first torsion spring 174a (to be described) and the driven plate 73.

FIGS. 3A, 4A, 5A, 6A and 7A will be explained prior to a detailed explanation of the torsion springs 74.

Figure 3A:
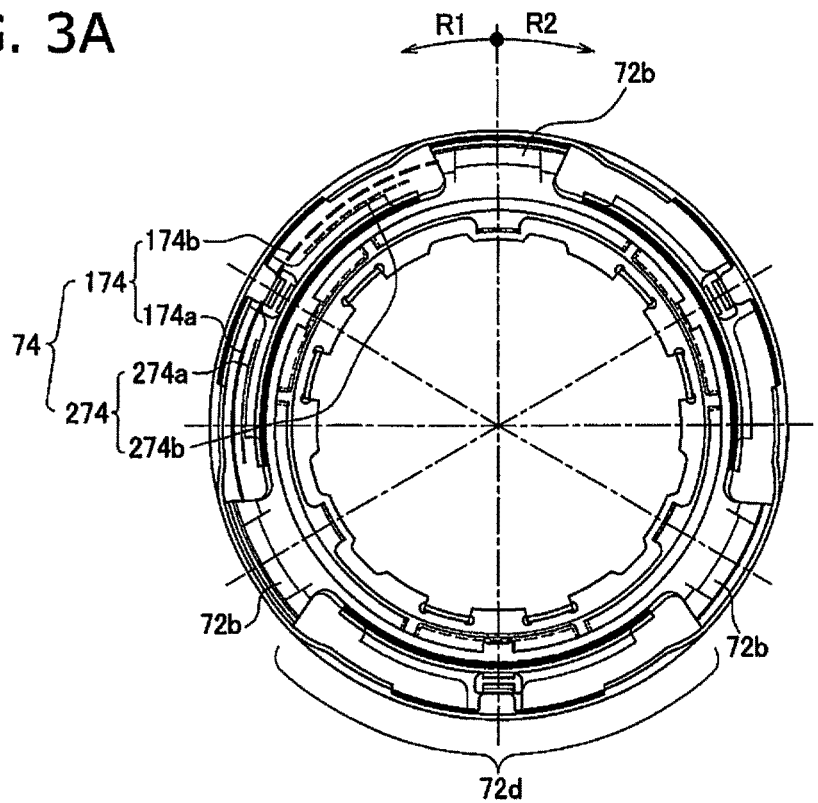
FIG. 3A is a front view of the lock-up device when θ=0.
Figure 3B:
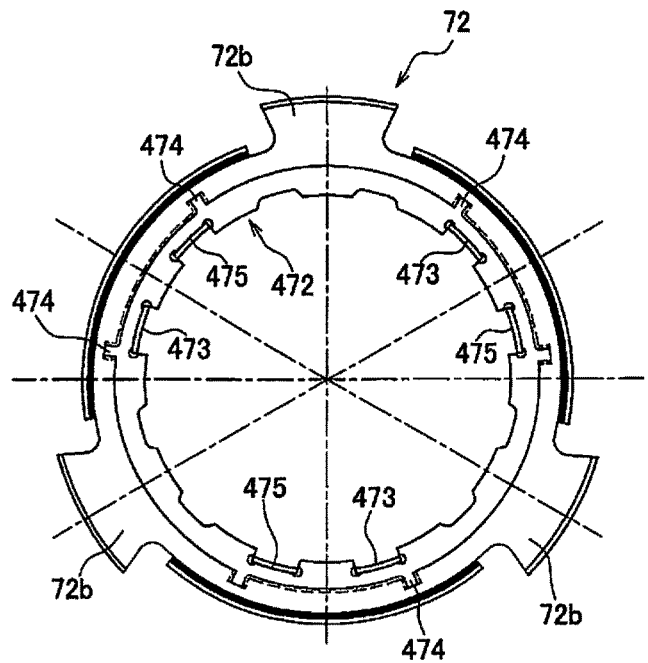
FIG. 3B is a front view of a drive plate of the lock-up device when θ=0.
Figure 3C:
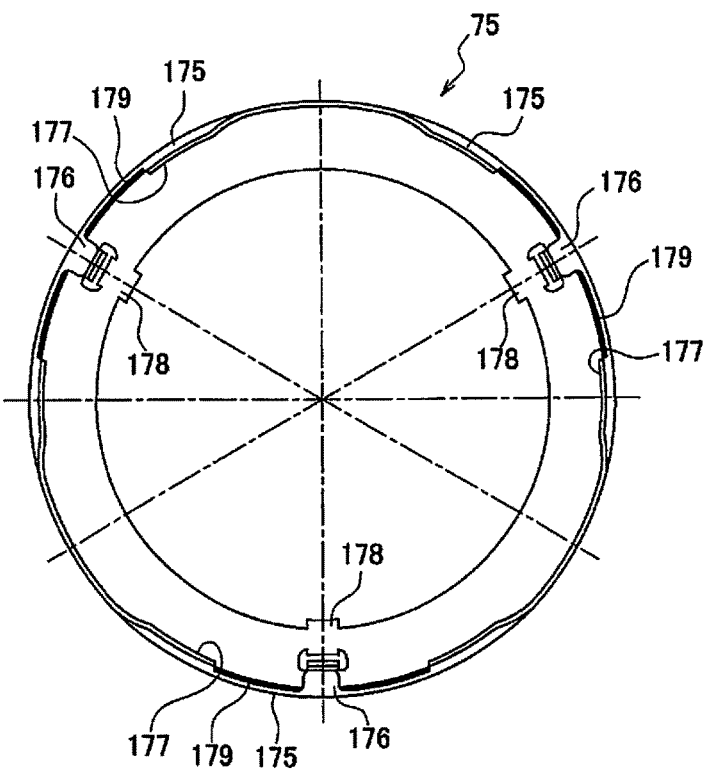
FIG. 3C is a front view of a float member of the lock-up device when θ=0.
Figure 3D:
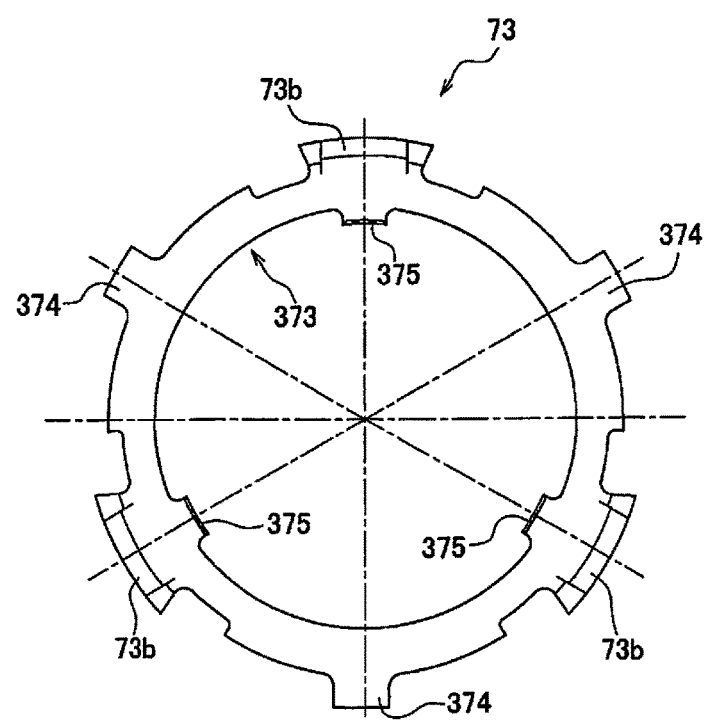
FIG. 3D is a front view of a driven plate of the lock-up device when θ=0.
Figure 4A:
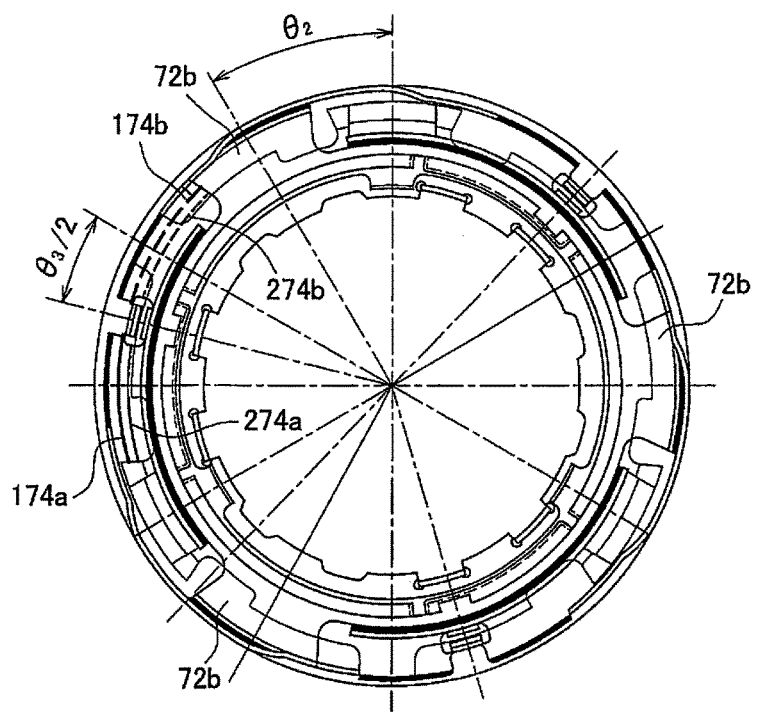
FIG. 4A is a front view of the lock-up device when θ=θ2.
Figure 4B:
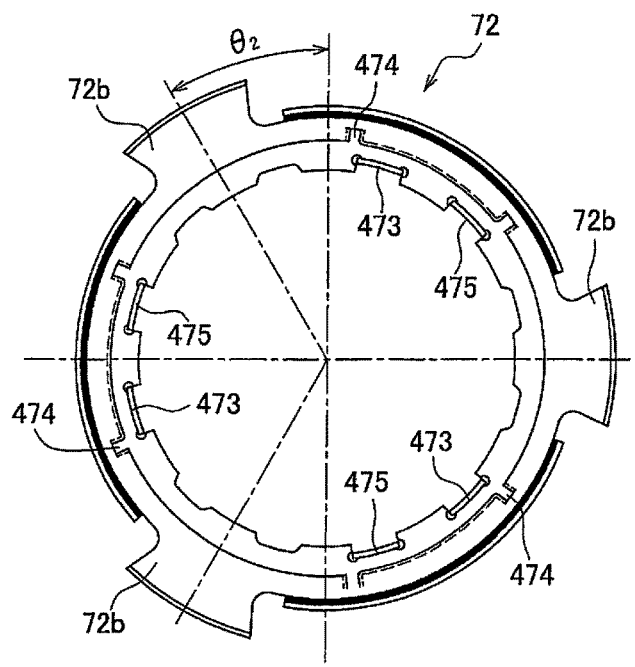
FIG. 4B is a front view of the drive plate of the lock-up device when θ=θ2.
Figure 5A:
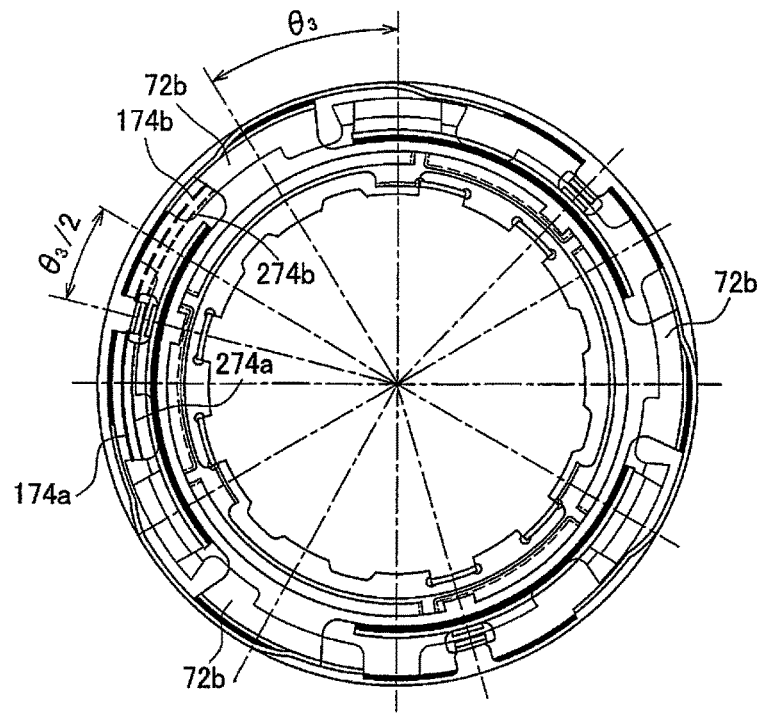
FIG. 5A is a front view of the lock-up device when θ=θ3.
Figure 5B:
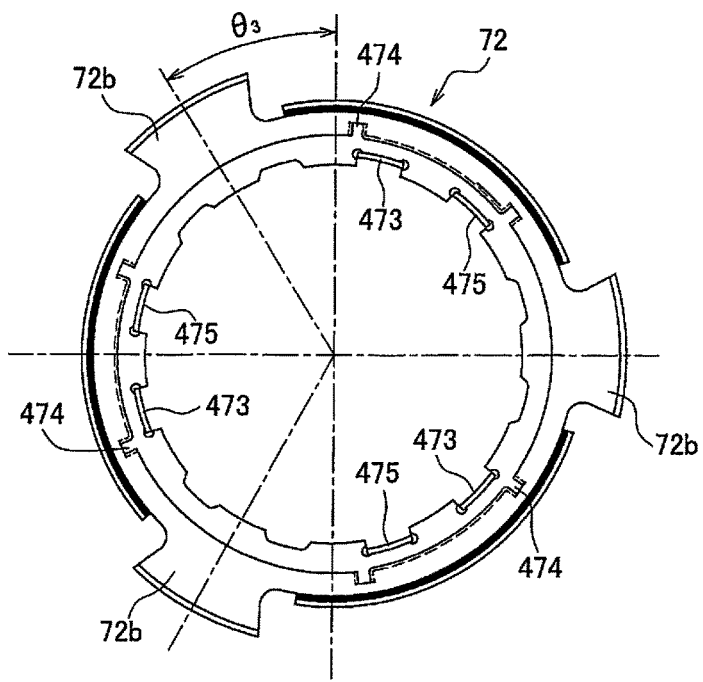
FIG. 5B is a front view of the drive plate of the lock-up device when θ=θ3.
Figure 5C:
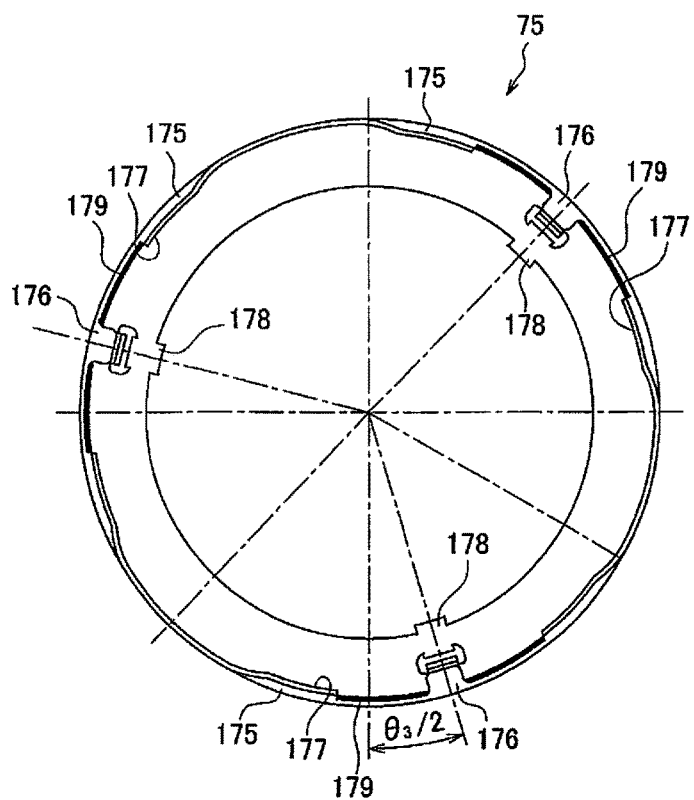
FIG. 5C is a front view of the float member of the lock-up device when θ=θ3.
Figure 5D:
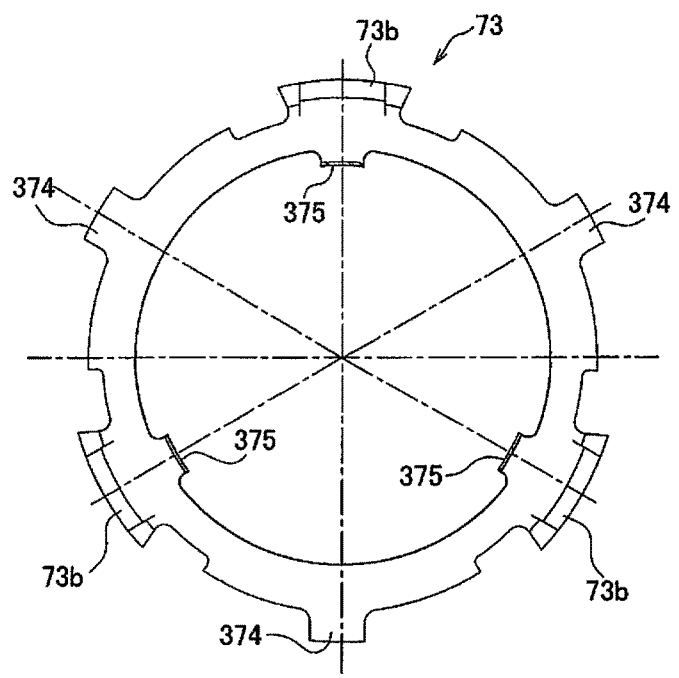
FIG. 5D is a front view of the driven plate of the lock-up device when θ=θ3.
Figure 6A:
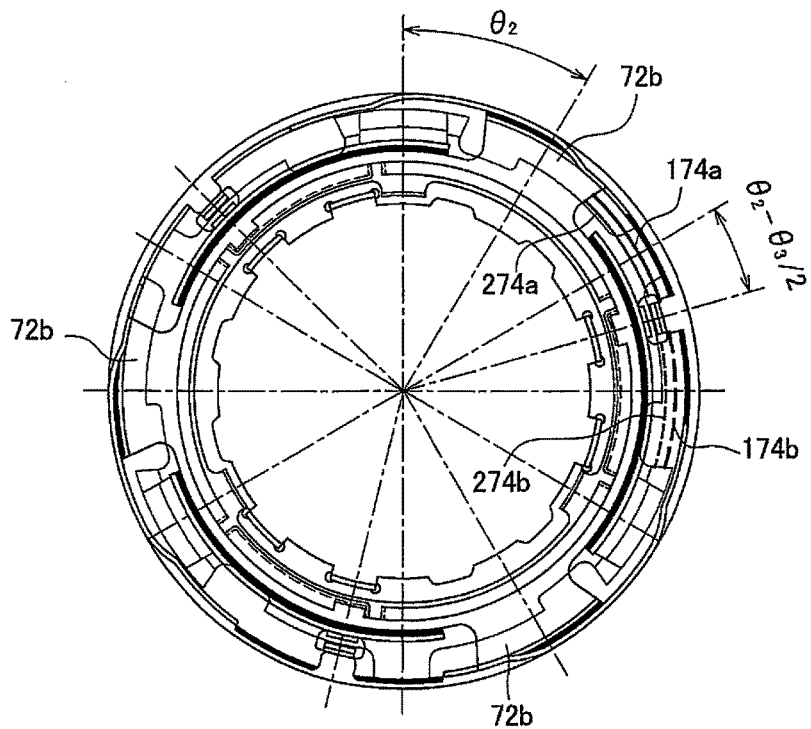
FIG. 6A is a front view of the lock-up device when θ=−θ2.
Figure 6B:
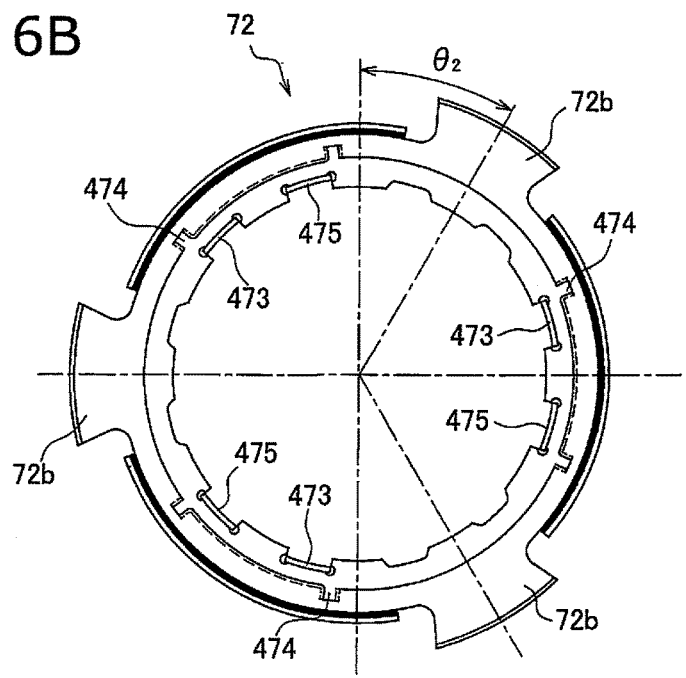
FIG. 6B is a front view of the drive plate of the lock-up device when θ=−θ2.
Figure 6C:
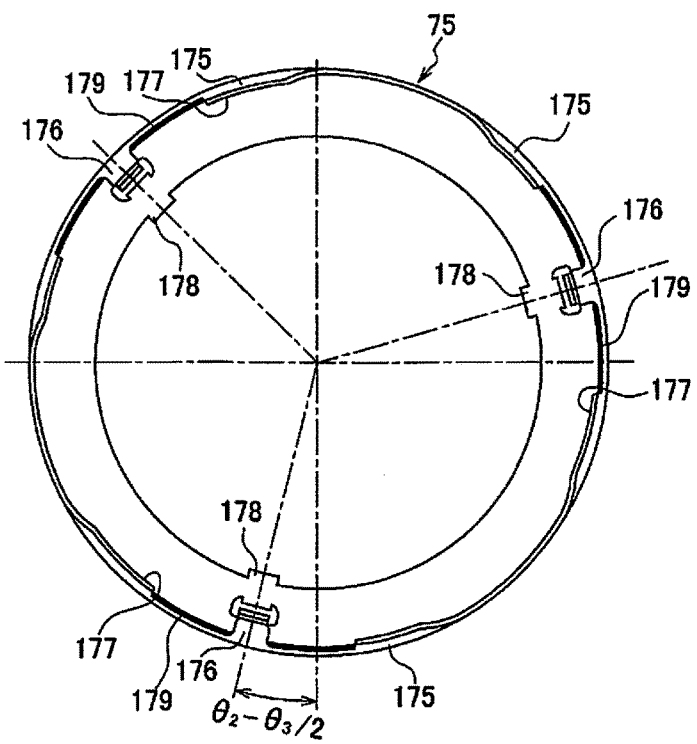
FIG. 6C is a front view of the float member of the lock-up device when θ=−θ2.
Figure 6D:
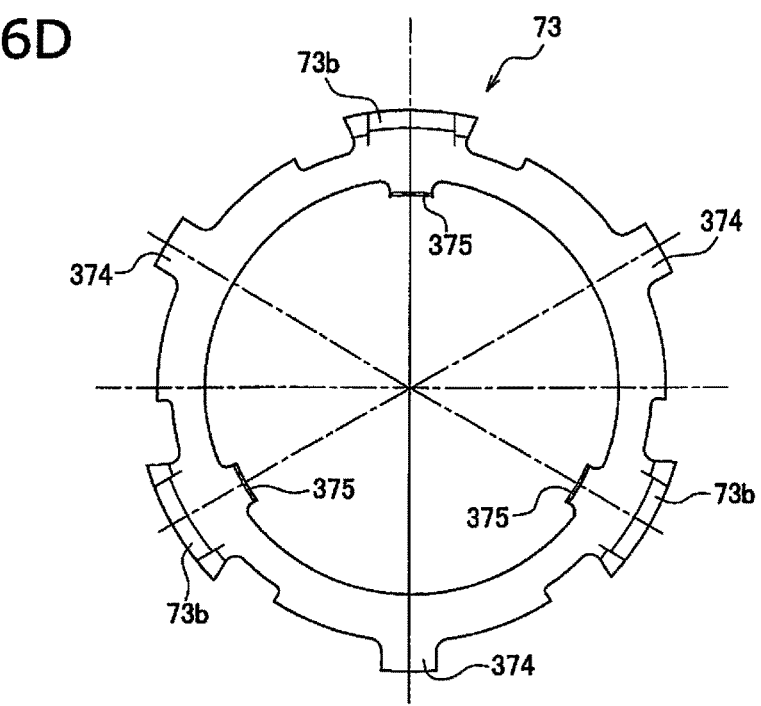
FIG. 6D is a front view of the driven plate of the lock-up device when θ=−θ2.
Figure 7A:
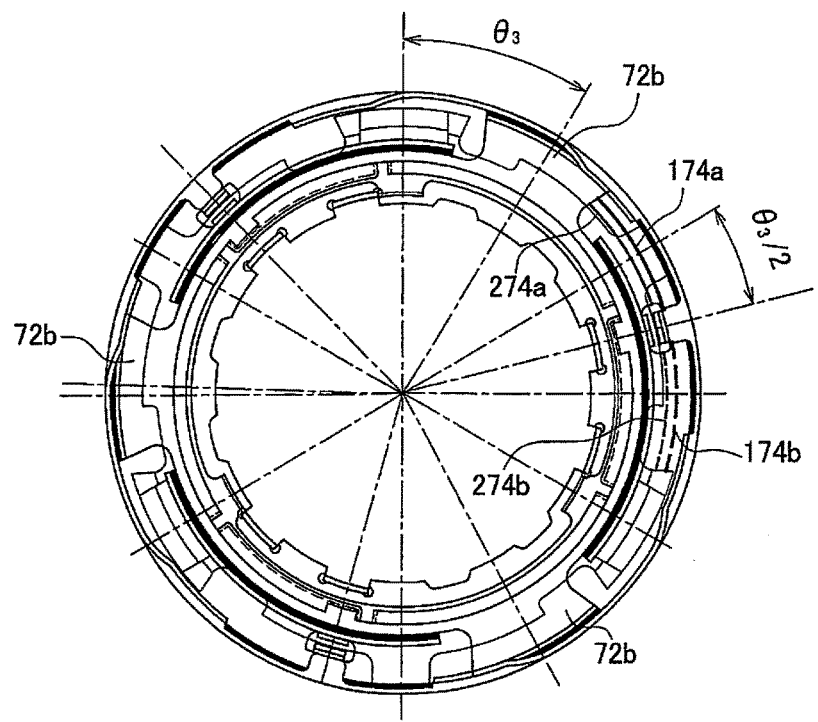
FIG. 7A is a front view of the lock-up device when θ=θ−3.
Figure 7B:
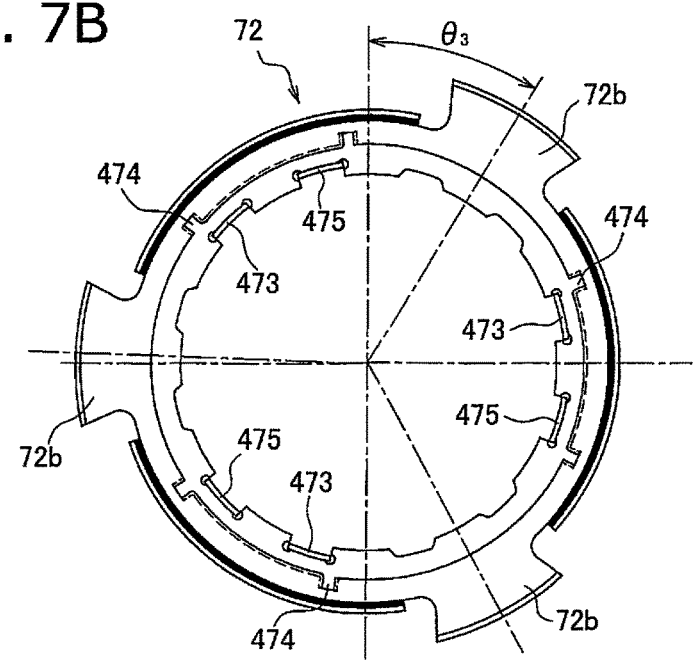
FIG. 7B is a front view of the drive plate of the lock-up device when θ=−θ3.
Figure 7C:
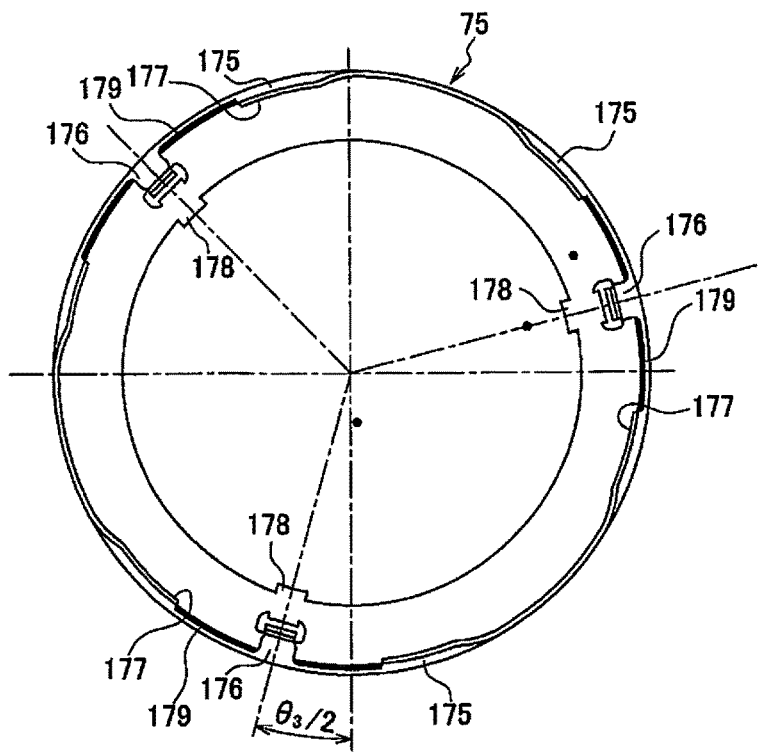
FIG. 7C is a front view of the float member of the lock-up device when θ=−θ3.
Figure 7D:
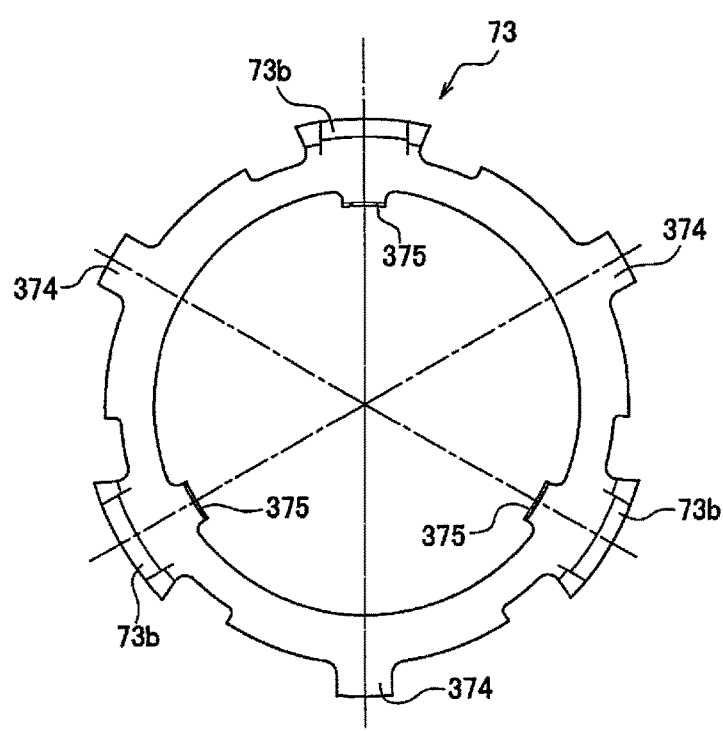
FIG. 7D is a front view of the driven plate of the lock-up device when θ=−θ3.

FIG. 3A is a diagram when a torsion angle θ is zero. FIGS. 4A and 5A are diagrams when the drive plate 72 is rotated in the R1 direction. FIGS. 6A and 7A are diagrams when the drive plate 72 is rotated in the R2 direction.

In FIGS. 3A, 4A, 5A, 6A and 7A, the first torsion springs 174 (to be described) and the second torsion springs 274 (to be described) are depicted with solid lines and broken lines. Further in FIGS. 3A, 4A, 5A, 6A and 7A, only one group of the first torsion springs 174 and the second torsion springs 274 is illustrated.

Further in FIGS. 3A, 4A, 5A, 6A and 7A, one of the first torsion springs is depicted with a solid line and "174a" is assigned thereto. On the other hand, the other of the first torsion springs is depicted with a broken line and "174b" is assigned thereto. Likewise, a second torsion spring, disposed in the inner peripheral part of the one first torsion spring 174a, is depicted with a solid line and "274a" is assigned thereto. On the other hand, a second torsion spring, disposed in the inner peripheral part of the other first torsion spring 174b, is depicted with a broken line and "274b" is assigned thereto.

As shown in FIGS. 3A, 4A, 5A, 6A and 7A, each group of the torsion springs 74 includes one pair of the first torsion springs 174 (exemplary first elastic members) and one pair of the second torsion springs 274 (exemplary second elastic members).

One pair of the first torsion springs 174 is disposed in series. One pair of the first torsion springs 174 is configured to be circumferentially compressed by relative rotation between the drive plate 72 and the driven plate 73. When described in detail, one pair of the first torsion springs 174 is configured to be circumferentially compressed in series by the relative rotation between the drive plate 72 and the driven plate 73. It should be noted that the first torsion springs 174 will be described below in more detail.

The free length of each second torsion spring 274 is shorter than that of each first torsion spring 174. The second torsion springs 274 are disposed in the inner peripheral parts of the first torsion springs 174. FIGS. 3A, 4A, 5A, 6A and 7A schematically show the condition. Specifically, FIGS. 3A, 4A, 5A, 6A and 7A show the first torsion springs 174 (174a, 174b) and the second torsion springs 274 (274a, 274b) in parallel. It should be noted that the second torsion springs 274 will be described below in more detail.

As shown in FIG. 1, the piston 71 is a member for clutch engagement and disengagement. The piston 71 has an annular shape. The piston 71 has an aperture in the center thereof. The piston 71 radially extends over the space 9 to divide the space 9 roughly in the axial direction.

An inner peripheral side tubular part 71b is formed on the inner peripheral edge of the piston 71 to extend axially toward the engine. The inner peripheral side tubular part 71b is supported by the engine side outer peripheral surface of the turbine hub 32 to be movable in the rotational direction and the axial direction. It should be noted that the piston 71 is configured to be restricted from axially moving toward the transmission when making contact with a part of the turbine hub 32 disposed on the transmission side of the piston 71. An annular seal ring 32b is mounted to the engine side outer peripheral surface of the turbine hub 32 to make contact with the inner peripheral surface of the inner peripheral side tubular part 71b. The seal ring 32b seals the inner peripheral edge of the piston 71 to prevent axial movement of oil.

Further, the piston 71 has a friction coupling part 71c on the outer peripheral part thereof. The friction coupling part 71c is an annular part having a predetermined length in the radial direction. The friction coupling part 71c has a planar shape. Specifically, both of the axially opposed surfaces of the friction coupling part 71c are arranged perpendicularly to the axial direction. An annular friction facing 76 is attached to the axially engine side one of the surfaces of the friction coupling part 71c. Thus, a clutch of the lock-up device 7 is composed of the piston 71 and the flat friction surface of the front cover 11.

The drive plate 72 is disposed on the axially transmission side of the outer peripheral part of the piston 71. The drive plate 72 is an annular member made of sheet metal. The drive plate 72 is composed of a body 472 (see FIG. 3), a fixation part 72a extending from the body 472 to the inner peripheral side, and torque transmission parts 72b extending from the body 472 to the outer peripheral side. The fixation part 72a makes contact with the axially transmission side surface of the piston 71, and is fixed to the piston 71 by a plurality of rivets 71d. The torque transmission parts 72b extend from the fixation part 72a to the outer peripheral side.

Further as shown in FIGS. 3B, 4B, 5B, 6B and 7B, the drive plate 72 further includes first restriction pawls 473 (exemplary second engaging parts), second restriction pawls 474 (exemplary third engaging parts) and third restriction pawls 475 (exemplary fourth engaging parts). The first restriction pawls 473 perform second rotational restriction (to be described) when the drive plate 72 is rotated in the R1 direction.

The first restriction pawls 473 extend from the body 472 toward the driven plate 73, and are integrally formed with the driven-plate-73 side part of the body 472. Each first restriction pawl 473 is disposed rotation-directionally between each second restriction pawl 474 and each third restriction pawl 475. The first restriction pawls 473 are formed in three positions on the inner peripheral side of the body 472 to be aligned at predetermined intervals.

The second restriction pawls 474 perform first rotational restriction (to be described) when the drive plate 72 is rotated in the R2 direction. The second restriction pawls 474 are formed on the body 472 to protrude toward the spring holder 75. The second restriction pawls 474 are integrally formed with the spring-holder-75 side part of the body 472. The second restriction pawls 474 are formed in three positions to be aligned at predetermined intervals.

The third restriction pawls 475 perform the second rotational restriction when the drive plate 72 is rotated in the R2 direction. The third restriction pawls 475 extend from the body 472 toward the driven plate 73, and are integrally formed with the driven-plate-73 side part of the body 472. The third restriction pawls 475 are formed in three positions on the inner peripheral side of the body 472 to be aligned at predetermined intervals. Each third restriction pawl 475 is disposed away from each first restriction pawl 473 at a predetermined interval in the R2 direction.

As shown in FIG. 3A, spring accommodation parts 72d are respectively formed rotation-directionally among the plural torque transmission parts 72b. In the present exemplary embodiment, the spring accommodation parts 72d are formed in three positions. In FIG. 3A, the reference sign 72d is only assigned to the spring accommodation part disposed in one position.

As shown in FIGS. 3A, 4A, 5A, 6A and 7A, each group of the torsion springs 74 as circumferentially extending coil springs is accommodated in each spring accommodation part 72d. Each group of the torsion springs 74 is a member for elastically and rotation-directionally coupling the drive plate 72 (the piston 71) serving as an input member and the driven plate 73 serving as an output member. Each group of the torsion springs 74 is composed of the first torsion springs 174a and 174b and the second torsion springs 274a and 274b.

When described in detail, one pair of the first torsion springs 174a and 174b is disposed in each spring accommodation part 72d to rotation-directionally act in series. Further, the plural first torsion springs 174a and 174b are formed to exert torsional stiffness having equal magnitude. It should be noted that as a whole, a total of six first torsion springs 174a and 174b are herein used.

The second torsion springs 274a and 274b are respectively disposed in the inner peripheral parts of one pair of the first torsion springs 174a and 174b. Specifically, the second torsion springs 274a and 274b are disposed in the inner peripheral parts of the first torsion springs 174a and 174b to be movable in the rotational direction. As a whole, a total of six second torsion springs 274a and 274b are used.

It should be herein noted that reference signs "74a", "174a" and "274a" are assigned to torsion springs disposed on the rotational-direction-R1 side (the left side in FIG. 3A) in the inside of each spring accommodation part 72d. On the other hand, reference signs "74b", "174b" and "274b" are assigned to torsion springs disposed on the rotational-direction-R2 side (the right side in FIG. 3A) in the inside of each spring accommodation part 72d.

Further, the second torsion springs 274a and 274b are formed to have a length shorter than that of the first torsion springs 174a and 174b. Yet further, the plural second torsion springs 274a and 274b are formed to have an equal length.

Moreover, the second torsion springs 274a and 274b are formed such that one of each pair of the second torsion springs 274a and 274b exerts torsional stiffness with different magnitude from that to be exerted by the other of each pair of the second torsion springs 274a and 274b. For example, the second torsion springs 274a and 274b are herein formed such that the second torsion spring 274a disposed on the rotational-direction-R1 side (the left side in FIG. 3A) exerts torsional stiffness with smaller magnitude than that to be exerted by the second torsion spring 274b disposed on the rotational-direction-R2 side (the right side in FIG. 3A).

In the construction, the first torsion spring 174a and the second torsion spring 274a are configured to rotation-directionally act in parallel. Likewise, the first torsion spring 174b and the second torsion spring 274b are also configured to rotation-directionally act in parallel. Further, a torsion spring system composed of the first torsion spring 174a and the second torsion spring 274a and that composed of the first torsion spring 174b and the second torsion spring 274b are configured to rotation-directionally act in series.

The driven plate 73 is a member for transmitting torque from the respective groups of the torsion springs 74 to the turbine 22. As shown in FIG. 1, the driven plate 73 is disposed to be rotatable with respect to the drive plate 72 (the piston 71). The driven plate 73 is disposed on the outer peripheral side of the turbine shell 30 of the turbine 22.

Further as shown in FIG. 1, the driven plate 73 is mainly composed of a body 373 (see FIG. 3D), an attachment part 73a and a plurality of pawls 73b. The attachment part 73a is fixed to the turbine shell 30 by, for instance, welding. The plural pawls 73b bend axially toward the engine from the outer peripheral edge of the attachment part 73a. The pawls 73b are opposed to the torque transmission parts 72b of the drive plate 72, and are inserted from the axially transmission side into the torque transmission parts 72b convexly curving to the axial engine side. Under the condition, the pawls 73b make contact with the both rotation-directional ends of one pair of the first torsion springs 174a and 174b disposed in each spring accommodation part 72d.

Figure 4C:
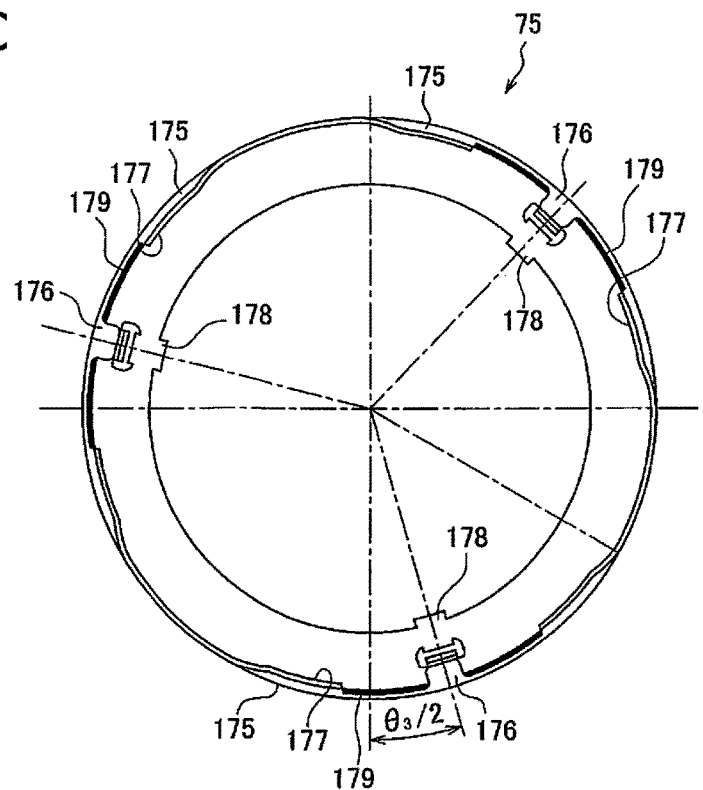
FIG. 4C is a front view of the float member of the lock-up device when θ=θ2.
Figure 4D:
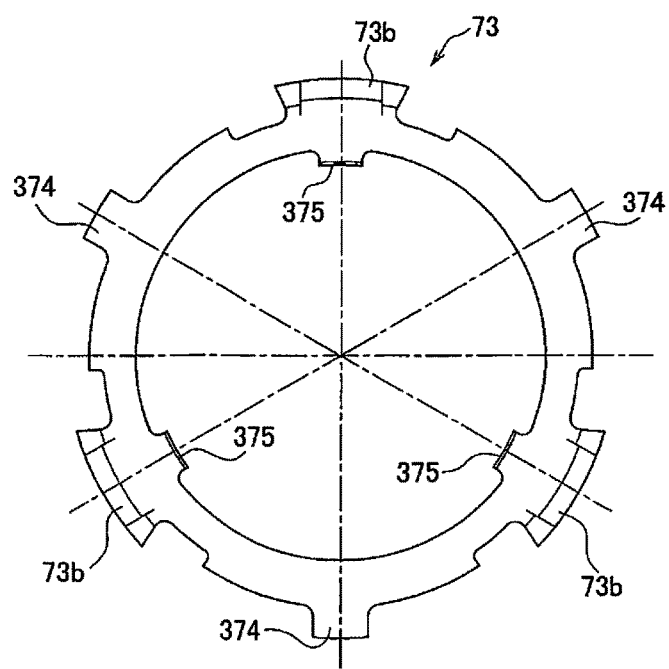
FIG. 4D is a front view of the driven plate of the lock-up device when θ=θ2.

Further, as shown in FIGS. 3D, 4D, 5D, 6D and 7D, the driven plate 73 has first stopper pawls 374 (exemplary first contact parts) and second stopper pawls 375 (exemplary second and fourth contact parts). The first stopper pawls 374 are formed on the outer peripheral end of the body 373 to outwardly protrude therefrom. The first stopper pawls 374 are formed in three positions on the outer peripheral part of the body 373 to be aligned at predetermined intervals. Fourth restriction pawls 177 (to be described) are contactable to the first stopper pawls 374 (see FIGS. 4A, 4C and 4D).

The second stopper pawls 375 are formed on the inner peripheral end of the body 373 to inwardly protrude therefrom. The second stopper pawls 375 are formed in three positions on the inner peripheral part of the body 373 to be aligned at predetermined intervals. The first restriction pawls 473 are contactable to the second stopper pawls 375 (see FIGS. 5A, 5B and 5D). When described in detail, each first restriction pawl 473 is contactable to the rotational-direction-R2 side lateral part of each second stopper pawl 375. The third restriction pawls 475 are also contactable to the second stopper pawls 375 (see FIGS. 7A, 7B and 7D). When described in detail, each third restriction pawl 475 is contactable to the rotation-directional-R1 side lateral part of each second stopper pawl 375.

The spring holder 75 functions as an intermediate float member. As shown in FIG. 1, the spring holder 75 restricts radial movement of the plural groups of the torsion springs 74, for instance, radial movement of three groups of the torsion springs 74. Specifically, radial movement of the first torsion springs 174a and 174b are restricted by radially supporting the first torsion springs 174a and 174b.

The spring holder 75 is disposed to be rotatable relative to the piston 71 and the driven plate 73. Further, the spring holder 75 is disposed to be rotatable relative to the drive plate 72 and the driven plate 73. The spring holder 75 has a C-shaped vertical cross-section that axially opens to one side.

As shown in FIGS. 3C, 4C, 5C, 6C and 7C, the spring holder 75 has a support part 175, coupling parts 176, the fourth restriction pawls 177 (exemplary first engaging parts) and third stopper pawls 178 (exemplary third contact parts).

The support part 175 is a part for supporting the respective groups of the torsion springs 74. Specifically, the support part 175 supports the respective groups of the torsion springs to be moved radially outward by centrifugal force.

Each coupling part 176 is rotation-directionally engaged with one pair of the first torsion springs 174a and 174b. The respective coupling parts 176 are integrally formed with the outer peripheral part of the support part 175. Specifically, the coupling parts 176 are formed on the outer peripheral part of the support part 175 to convexly curve therefrom to the driven-plate-73 side of the support part 175. The coupling parts 176 are formed in three positions on the outer peripheral part of the support part 175 to be aligned at predetermined intervals. Each coupling part 176 is disposed between one pair of the first torsion springs 174a and 174b. Thus, each coupling part 176 circumferentially couples the first torsion springs 174a and 174b in each group in series.

The fourth restriction pawls 177 are parts extending from the outer peripheral part of the support part 175 toward the driven plate 73. Each fourth restriction pawl 177 is formed on the outer peripheral part of the support part 185 to be separated away from each coupling part 176 at a predetermined interval. A recess 179 is thereby formed between each fourth restriction pawl 177 and each coupling part 176. The first stopper pawls 374 of the driven plate 73 are disposed in the recesses 179. The fourth restriction pawls 177 are contactable to the first stopper pawls 374 (see FIGS. 4A, 4C and 4D).

The third stopper pawls 178 are formed on the inner peripheral end of the support part 175 to inwardly protrude therefrom. The third stopper pawls 178 are formed in three positions on the inner peripheral part of the support part 175 to be aligned at predetermined intervals. The second restriction pawls 474 are contactable to the third stopper pawls 178 (see FIGS. 6A, 6B and 6C).

In the R1 direction, the rotation restricting unit 80 is capable of performing the first rotational restriction (first R1 rotational restriction) and the second rotational restriction (second R1 rotational restriction). Similarly in the R2 direction, the rotation restricting unit 80 is also capable of performing the first rotational restriction (first R2 rotational restriction) and the second rotational restriction (second R2 rotational restriction).

As shown in FIG. 4A, in the first R1 rotational restriction, when the drive plate 72 is rotated in the R1 direction, the first torsion spring 174a in each group and the second torsion spring 274a in each group are configured to be restricted and brought to the deactivated state by causing the spring holder 75 to be engaged with the driven plate 73. Specifically, the first torsion spring 174a in each group and the second torsion spring 274a in each group are configured to be restricted and brought to the deactivated state by causing the fourth restriction pawls 177 to make contact with the first stopper pawls 374. In the condition that the fourth restriction pawls 177 make contact with the first stopper pawls 374, each first restriction pawl 473 is disposed circumferentially between each fourth restriction pawl 177 and each second stopper pawl 375.

As shown in FIG. 6A, in the first R2 rotational restriction, when the drive plate 72 is rotated in the R2 direction, the first torsion spring 174a in each group and the second torsion spring 274a in each group are configured to be restricted and brought to the deactivated state by causing the drive plate 72 to be engaged with the spring holder 75. Specifically, the first torsion spring 174a in each group and the second torsion spring 274a in each group are configured to be restricted and brought to the deactivated state by causing the second restriction pawls 474 to make contact with the third stopper pawls 178. In the condition that the second restriction pawls 474 make contact with the third stopper pawls 178, each third restriction pawl 475 is disposed circumferentially between each second restriction pawl 474 and each second stopper pawl 375.

As described above, the first torsion spring 174a in each group and the second torsion spring 274a in each group are configured to be restricted and brought to the deactivated state when the first R1 rotational restriction and the first R2 rotational restriction are performed by the rotation restricting unit 80.

When the drive plate 72 is further rotated in the R1 direction after the first R1 rotational restriction is performed, the second R1 rotational restriction is performed as shown in FIG. 5A. In the second R1 rotational restriction, the first torsion spring 174b in each group and the second torsion spring 274b in each group are configured to be restricted and brought to the deactivated state by causing the drive plate 72 to be engaged with the driven plate 73. Specifically, the first torsion spring 174b in each group and the second torsion spring 274b in each group are configured to be restricted and brought to the deactivated state by causing each first restriction pawl 473 to make contact with each second stopper pawl 375 (the rotational-direction-R2 side lateral part of each second stopper pawl 375).

Likewise, when the drive plate 72 is further rotated in the R2 direction after the first R2 rotational restriction is performed, the second R2 rotational restriction is performed as shown in FIG. 7A. In the second R2 rotational restriction, the first torsion spring 174b in each group and the second torsion spring 274b in each group are configured to be restricted and brought to the deactivated state by causing the drive plate 72 to be engaged with the driven plate 73. Specifically, the first torsion spring 174b in each group and the second torsion spring 274b in each group are configured to be restricted and brought to the deactivated state by causing each third restriction pawl 475 to make contact with each second stopper pawl 375 (the rotational-direction-R1 side lateral part of each second stopper pawl 375).

Actions of Torque Converter

Immediately after starting of the engine, operating oil is configured to be supplied to the interior of the torque converter body 5 through the first port 17 and the third port 19, whereas operating oil is discharged through the second port 18. The operating oil, supplied through the first port 17, flows through the first hydraulic chamber A to the outer peripheral side, passes through the second hydraulic chamber B, and flows into the fluid actuation chamber 6. Thus, the piston 71 is moved axially toward the transmission by difference in hydraulic pressure between the first hydraulic chamber A and the second hydraulic chamber B. Put differently, the friction facing 76 is separated away from the front cover 11, and thus, a lock-up state is released. While the lock-up state is thus released, torque transmission between the front cover 11 and the turbine 22 is configured to be performed by fluid drive between the impeller 21 and the turbine 22.

Entire Actions of Lock-Up Device

When the speed ratio of the torque converter 1 increases and the rotation speed of the input shaft reaches a predetermined speed, the operating oil is discharged from the first hydraulic chamber A through the first port 17. As a result, due to the difference in hydraulic pressure between the first hydraulic chamber A and the second hydraulic chamber B, the piston 71 is moved toward the front cover 11 and the friction facing 76 is pressed onto the flat friction surface of the front cover 11. Consequently, torque of the front cover 11 is transmitted from the piston 71 to the driven plate 73 through the drive plate 72 and the torsion springs 74. The torque is further transmitted from the driven plate 73 to the turbine 22. Put differently, the front cover 11 is mechanically coupled to the turbine 22, and the torque of the front cover 11 is directly outputted to the input shaft through the turbine 22.

It should be noted that when torsional vibration is inputted as described above and the torsion springs 74 are repeatedly compressed, the torsion springs 74 are moved radially outward by centrifugal force, and slide against the support part 175 of the spring holder 75. However, the spring holder 75 is a member configured to be rotation-directionally moved together with the torsion springs 74. Thus, slide resistance between the both members greatly decreases, and torsional vibration reducing performance is sufficiently exerted.

Actions of Vibration Reducing Mechanism in Lock-Up Device

As described above, in the lock-up engagement state, the lock-up device 7 is configured to transmit torque and also absorb and attenuate torsional vibration to be inputted thereto from the front cover 11. The action of the vibration reducing mechanism in the lock-up device will be explained on the basis of FIGS. 3A to 7A, FIGS. 3B to 7B, FIGS. 3C to 7C, FIGS. 3D to 7D and FIG. 8.

Action in R1 Directional Rotation

In the condition of FIGS. 3A, 3B, 3C and 3D, when the drive plate 72 is rotated in the R1 direction with respect to the driven plate 73 and thus a torsion angle θ is formed, the first torsion springs 174a and 174b are rotation-directionally compressed between the drive plate 72 and the driven plate 73. The condition is referred to as a first compressed state J1A. Specifically, the first torsion springs 174a and 174b are rotation-directionally compressed between the relevant torque transmission part 72b of the drive plate 72 and the relevant pawl 73b of the driven plate 73. At this time, the spring holder 75 is compression-directionally moved by the torsion springs 74a and 74b, and is rotated relatively to the drive plate 72 and the driven plate 73.

When the torsion angle θ further increases under the condition, the first torsion springs 174a and 174b and the second torsion springs 274a and 274b are rotation-directionally compressed between the drive plate 72 and the driven plate 73. A first bent point P1A in FIG. 8 corresponds to a point of time when compression of the second torsion springs 274a and 274b starts.

Subsequently, the first torsion springs 174a and 174b in each group and the second torsion springs 274a and 274b in each group are rotation-directionally compressed between the drive plate 72 and the driven plate 73. The condition is referred to as a second compressed state J2A. Specifically, the first torsion springs 174a and 174b and the second torsion springs 274a and 274b are rotation-directionally compressed between the relevant torque transmission part 72b of the drive plate 72 and the relevant pawl 73b of the driven plate 73. At this time, the spring holder 75 is compression-directionally moved by the torsion springs 74a and 74b, and is rotated relatively to the drive plate 72 and the driven plate 73.

When the torsion angle θ further increases under the condition, as shown in FIGS. 4A, 4B, 4C and 4D, the respective fourth restriction pawls 177 of the spring holder 75 make contact with the respective first stopper pawls 374 of the driven plate 73. Put differently, the spring holder 75 and the driven plate 73 are locked. Thus, the first torsion spring 174a in each group and the second torsion spring 274a in each group are deactivated. The point of time corresponds to a second bent point P2A in FIG. 8. The second bent point P2A corresponds to the condition shown in FIG. 4A.

Subsequently, the first torsion spring 174b in each group and the second torsion spring 274b in each group are rotation-directionally compressed between the relevant coupling part 176 of the spring holder 75 and the driven plate 73. The condition is referred to as a third compressed state J3A. Specifically, the first torsion spring 174b and the second torsion spring 274b are rotation-directionally compressed between the relevant torque transmission part 72b of the drive plate 72 and the relevant pawl 73b of the driven plate 73.

When the torsion angle θ further increases under the condition, as shown in FIGS. 5A, 5B, 5C and 5D, the respective first restriction pawls 473 of the drive plate 72 finally make contact with the respective second stopper pawls 375 of the driven plate 73. Put differently, the drive plate 72 and the driven plate 73 are further locked. Thus, the first torsion spring 174b in each group and the second torsion spring 274b in each group are deactivated. The point of time corresponds to a third bent point P3A in FIG. 8. The third bent point P3A corresponds to the condition shown in FIG. 5A. Under the condition, compression of the compressible first torsion spring 174b in each group and that of the compressible second torsion spring 274b in each group stop. The condition is referred to as a compression stopped state. In short, the damper actions of the torsion springs 74 (174a, 174b, 274a and 274b) stop.

Action in R2 Directional Rotation

In the condition shown in FIGS. 3A, 3B, 3C and 3D, when the drive plate 72 is rotated in the R2 direction with respect to the driven plate 73 and thus the torsion angle θ is formed, the first torsion springs 174a and 174b are rotation-directionally compressed between the drive plate 72 and the driven plate 73. The condition is referred to as a first compressed state J1B. Specifically, the first torsion springs 174a and 174b are rotation-directionally compressed between the relevant torque transmission part 72b of the drive plate 72 and the relevant pawl 73b of the driven plate 73. At this time, the spring holder 75 is compression-directionally moved by the torsion springs 74a and 74b, and is rotated relatively to the drive plate 72 and the driven plate 73.

When the torsion angle θ further increases under the condition, the first torsion springs 174a and 174b and the second torsion springs 274a and 274b are rotation-directionally compressed between the drive plate 72 and the driven plate 73. A first bent point P1B in FIG. 8 corresponds to a point of time when compression of the second torsion springs 274a and 274b starts.

Subsequently, the first torsion springs 174a and 174b in each group and the second torsion springs 274a and 274b in each group are rotation-directionally compressed between the drive plate 72 and the driven plate 73. The condition is referred to as a second compressed state J2B. Specifically, the first torsion springs 174a and 174b and the second torsion springs 274a and 274b are rotation-directionally compressed between the relevant torque transmission part 72b of the drive plate 72 and the relevant pawl 73b of the driven plate 73. At this time, the spring holder 75 is compression-directionally moved by the torsion springs 74a and 74b, and is rotated relatively to the drive plate 72 and the driven plate 73.

When the torsion angle θ further increases under the condition, as shown in FIGS. 6A, 6B, 6C and 6D, the respective second restriction pawls 474 of the drive plate 72 make contact with the respective third stopper pawls 178 of the spring holder 75. Put differently, the drive plate 72 and the spring holder 75 are locked. Thus, the first torsion spring 174a in each group and the second torsion spring 274a in each group are deactivated. The point of time corresponds to a second bent point P2B in FIG. 8. The second bent point P2B corresponds to the condition shown in FIG. 6A.

Subsequently, the first torsion spring 174b in each group and the second torsion spring 274b in each group are rotation-directionally compressed between the relevant coupling part 176 of the spring holder 75 and the driven plate 73. The condition is referred to as a third compressed state J3B. Specifically, the first torsion spring 174b and the second torsion spring 274b are rotation-directionally compressed between the relevant torque transmission part 72b of the drive plate 72 and the relevant pawl 73b of the driven plate 73.

When the torsion angle θ further increases under the condition, as shown in FIGS. 7A, 7B, 7C and 7D, the respective third restriction pawls 475 of the drive plate 72 finally make contact with the respective second stopper pawls 375 of the driven plate 73. Put differently, the drive plate 72 and the driven plate 73 are further locked. Thus, the first torsion spring 174b in each group and the second torsion spring 274b in each group are deactivated. The point of time corresponds to a third bent point P3B in FIG. 8. The third bent point P3B corresponds to the condition shown in FIG. 7A. Under the condition, compression of the compressible first torsion spring 174b in each group and that of the compressible second torsion spring 274b in each group stop. The condition is referred to as the compression stopped state. In short, the damper actions of the torsion springs 74 (174a, 174b, 274a and 274b) stop.

Torsional Vibration Reducing Characteristics of Lock-Up Device

Figure 8:
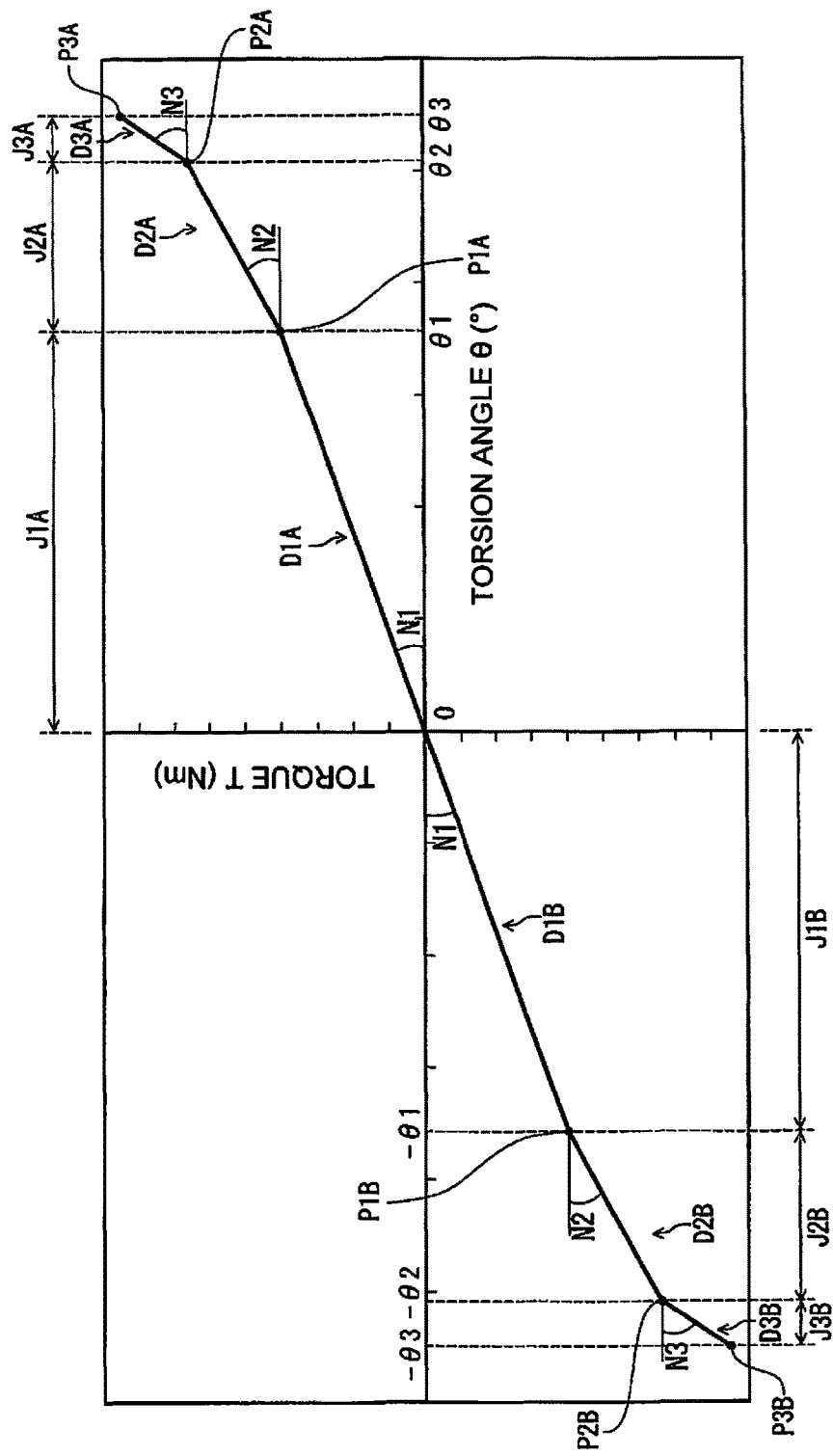
FIG. 8 is a diagram for representing torsional characteristics of the lock-up device.

Using FIG. 8, explanation will be provided for torsional characteristics where the torsion springs 74 are activated as described above. It should be noted that for easy explanation, the torsional characteristics will be herein explained with use of a pair of the torsion springs 74 (174a, 174b, 274a and 274b).

Characteristics in R1 Directional Rotation

When the drive plate 72 is rotated in the R1 direction with respect to the driven plate 73, the torsional stiffness of the two first torsion springs 174a and 174b disposed in series is set as a torsional stiffness N1 of the system in the first compressed state J1A. A first gradient D1A of the torsional characteristics is then set on the basis of the torsional stiffness N1 of the system. Next, when the torsion angle exceeds θ1 shown in FIG. 8 and the second compressed state J2A is produced, a torsional stiffness N2 of the system is set by combining the torsional stiffness of one pair of the first and second torsion springs 174a and 274a disposed in parallel and the torsional stiffness of another pair of the first and second torsion springs 174b and 274b disposed in parallel. A second gradient D2A of the torsional characteristics is then set on the basis of the torsional stiffness N2 of the system.

Subsequently, when the torsion angle reaches θ2 shown in FIG. 8, the relevant fourth restriction pawl 177 (the lateral part of the relevant recess 179) of the spring holder 75 makes contact with the relevant first stopper pawl 374 of the driven plate 73. The first torsion spring 174a and the second torsion spring 274a in each group are thereby deactivated. Thus, the second compressed state J2A transitions to the third compressed state J3A. Accordingly, the torsional stiffness of one pair of the first and second torsion springs 174b and 274b disposed in parallel is set as a torsional stiffness N3 of the system. A third gradient D3A of the torsional characteristics is then set on the basis of the torsional stiffness N3 of the system. Trilinear torsional characteristics are set in this manner.

Finally, when the torsion angle reaches θ3 shown in FIG. 8, the relevant first restriction pawl 473 of the drive plate 72 makes contact with the relevant second stopper pawl 375 of the driven plate 73. The first torsion spring 174b and the second torsion spring 274b are thereby deactivated. Thus, the third compressed state J3A transitions to the compression stopped state. The torque in the compression stopped state will be the maximum torque.

The torsional characteristics herein described relate to the torsional characteristics of one pair of the first torsion springs 174a and 174b and one pair of the second torsion springs 274a and 274b disposed in the inner peripheral parts of these paired-off first torsion springs. Thus, the torsional characteristics of the entire lock-up device 7, i.e., the torsional characteristics of plural groups of the first torsion springs 174a and 174b and plural groups of the second torsion springs 274a and 274b are set similarly to those described above.

Characteristics in R2 Directional Rotation

In this case, the torsional stiffness N1 of the system and the torsional stiffness N2 of the system are the same as those described in the aforementioned section "Characteristics in R1 Directional Rotation". Put differently, the first gradient D1A of the torsional characteristics and the second gradient D2A of the torsional characteristics are set similarly to those described in the aforementioned section "Characteristics in R1 Directional Rotation".

When the torsion angle reaches −θ2 shown in FIG. 8 in the second compressed state J2B, the relevant second restriction pawl 474 of the drive plate 72 makes contact with the relevant third stopper pawl 178 of the spring holder 75. The first torsion spring 174a and the second torsion spring 274a in each group are thereby deactivated. Thus, the second compressed state J2B transitions to the third compressed state J3B. Accordingly, the torsional stiffness of one pair of the first and second torsion springs 174b and 274b disposed in parallel is set as the torsional stiffness N3 of the system. The third gradient D3A of the torsional characteristics is then set on the basis of the torsional stiffness N3 of the system. Trilinear torsional characteristics are set in this manner.

Finally, when the torsion angle reaches −θ3 shown in FIG. 8, the relevant third restriction pawl 475 of the drive plate 72 makes contact with the relevant second stopper pawl 375 of the driven plate 73. The first torsion spring 174b and the second torsion spring 274b in each group are thereby deactivated. Thus, the third compressed state J3B transitions to the compression stopped state. The torque in the compression stopped state will be the maximum torque.

The torsional characteristics herein described relate to the torsional characteristics of one pair of the first torsion springs 174a and 174b and one pair of the second torsion springs 274a and 274b disposed in the inner peripheral parts of the paired-off first torsion springs. Thus, the torsional characteristics of the entire lock-up device 7, i.e., the torsional characteristics of plural groups of the first torsion springs 174a and 174b and plural groups of the second torsion springs 274a and 274b are set similarly to those described above.

In the exemplary embodiment of the lock-up device 7, the rotation restricting unit 80 is configured to restrict and bring each first torsion spring 174a and each second torsion spring 274a to the deactivated state by at least either of engagement of the spring holder 75 with the driven plate 73 and engagement of the drive plate 72 with the spring holder 75.

In the exemplary embodiment of the lock-up device 7, for instance, when power of the engine is inputted into the drive plate 72, the first torsion springs 174 in each group firstly begin to be compressed in accordance with the torsion angle (rotational amount) of the drive plate 72 with respect to the driven plate 73. Accordingly, torsional vibration is absorbed and attenuated in accordance with the torsional stiffness of the first torsion springs 174 in each group (first stage compressed state J1A, J1B). Next, when the first torsion springs 174 in each group and the second torsion springs 274 in each group begin to be compressed, torsional vibration is absorbed and attenuated in accordance with the torsional stiffness of the first torsion springs 174 in each group and the second torsion springs 274 in each group (second stage compressed state J2A, J2B). Subsequently, each first torsion spring 174a and each second torsion spring 274a are restricted and brought to the deactivated state by the rotation restricting unit 80 (first activation restriction; first bent point P1A, P1B). Then, torsional vibration is absorbed and attenuated in accordance with the torsional stiffness of the first torsion spring 174b in each group and that of the second torsion spring 274b in each group (third stage compressed state J3A, J3B).

In the exemplary embodiment of the lock-up device 7, the rotation restricting unit 80 is configured to restrict and bring each first torsion spring 174a and each second torsion spring 274a to the deactivated state by at least either of the engagement of the spring holder 75 with the driven plate 73 and the engagement of the drive plate 72 with the spring holder 75. Put differently, in the exemplary embodiment of the lock-up device 7, multistage torsional characteristics, for instance, three stage torsional characteristics, are formed without causing the coiled parts of the torsion springs to be closely contacted. Thus, the present lock-up device 7 can enhance durability of the torsion springs. Moreover, the exemplary embodiment of the lock-up device 7 can flexibly set the second bent point P2A, P2B between the second stage compressed state J2A, J2B and the third stage compressed state J3A, J3B. In other words, the exemplary embodiment of the lock-up device 7 can enhance flexibility in designing of multistage characteristics.

In the rotation restricting unit 80 of the exemplary embodiment of the lock-up device 7, the spring holder 75 is configured to be engaged with the driven plate 73 when the drive plate 72 is rotated in the R1 direction. In the rotation restricting unit 80, the drive plate 72 is configured to be engaged with the spring holder 75 when the drive plate 72 is rotated in the R2 direction oriented oppositely to the R1 direction.

According to the exemplary embodiment of the lock-up device 7, for instance, when the drive plate 72 is rotated in the R1 direction under the third stage compressed state J3A, J3B, each first torsion spring 174a and each second torsion spring 274a are restricted and brought to the deactivated state by causing the spring holder 75 to be engaged with the driven plate 73. On the other hand, when the drive plate 72 is rotated in the R2 direction under the third stage compressed state J3A, J3B, each first torsion spring 174a and each second torsion spring 274a are restricted and brought to the deactivated state by causing the drive plate 72 to be engaged with the spring holder 75.

Thus, even when the respective first torsion springs 174a and 174b composing the first torsion springs 174 in each group have different magnitudes of stiffness, each first torsion spring 174a and each second torsion spring 274a can be restricted and brought to the deactivated state. Further, even when the respective second torsion springs 274a and 274b composing the second torsion springs 274 in each group have different magnitudes of stiffness, each first torsion spring 174a and each second torsion spring 274a can be restricted and brought to the deactivated state.

In the exemplary embodiment of the lock-up device 7, the rotation restricting unit 80 is configured to restrict and bring each first torsion spring 174b and each second torsion spring 274b to the deactivated state by engagement of the drive plate 72 with the driven plate 73 after restricting and bringing each first torsion spring 174a and each second torsion spring 274b to the deactivated state.

According to the exemplary embodiment of the lock-up device 7, for instance, under the third compressed state J3A, J3B, each first torsion spring 174b and each second torsion spring 274b are restricted and brought to the deactivated state by the engagement of the drive plate 72 with the driven plate 73. Accordingly, the upper limit of the third stage compressed state J3A, J3B is set. Thus, the exemplary embodiment of the lock-up device 7 can flexibly set the upper limit of the multistage torsional characteristics without causing the coiled parts of the elastic members to be closely contacted. In other words, the exemplary embodiment of the lock-up device 7 can enhance flexibility in designing of multistage characteristics without causing a drawback as described above.

In the exemplary embodiment of the lock-up device 7, the spring holder 75 has the coupling parts 176 for circumferentially coupling the first torsion springs 174 in each group in series and the fourth restriction pawls 177 that are integrally formed with the coupling parts 176 and are engaged with the driven plate 73. The driven plate 73 has the first stopper pawls 374 with which the fourth restriction pawls 177 make contact. The rotation restricting unit 80 is configured to restrict and bring each first torsion spring 174a and each second torsion spring 274a to the deactivated state by causing the fourth restriction pawls 177 to make contact with the first stopper pawls 374.

According to the exemplary embodiment of the lock-up device 7, for the purpose of enabling function of the rotation restricting unit 80, the fourth restriction pawls 177 are prepared for the spring holder 75 whereas the first stopper pawls 374 are prepared for the driven plate 73. With a thus constructed lock-up device 7, the rotation restricting unit 80 can be activated without greatly modifying the device construction. Put differently, the aforementioned advantageous effect can be obtained without increasing the number of components.

In the exemplary embodiment of the lock-up device 7, the drive plate 72 has the first restriction pawls 473 formed to face the driven plate 73. The driven plate 73 has the second stopper pawls 375 with which the first restriction pawls 473 make contact. The rotation restricting unit 80 is configured to restrict and bring each first torsion spring 174b and each second torsion spring 274b to the deactivated state by causing the first restriction pawls 473 to make contact with the second stopper pawls 375 after restricting and bringing each first torsion spring 174a and each second torsion spring 274a to the deactivated state.

According to the exemplary embodiment of the lock-up device 7, for the purpose of enabling function of the rotation restricting unit 80, the first restriction pawls 473 are prepared for the drive plate 72 whereas the second stopper pawls 375 are prepared for the driven plate 73. With thus constructed lock-up device 7, the rotation restricting unit 80 can be activated without greatly modifying the device construction. Put differently, the aforementioned advantageous effect can be obtained without increasing the number of components.

In the exemplary embodiment of the lock-up device 7, each first restriction pawl 473 is configured to be disposed circumferentially between the relevant fourth restriction pawl 177 and the relevant second stopper pawl 375 in the condition that the fourth restriction pawls 177 make contact with the first stopper pawls 374. With thus constructed lock-up device 7, the rotation restricting unit 80 is capable of further performing rotational restriction in the third bent point P3A after performing rotational restriction in the second bent point P2A.

In the exemplary embodiment of the lock-up device 7, the drive plate 72 has the second restriction pawls 474 formed to face the spring holder 75. The spring holder 75 has the third stopper pawls 178 with which the second restriction pawls 474 make contact. The rotation restricting unit 80 is configured to restrict and bring each first torsion spring 174a and each second torsion spring 274a to the deactivated state by causing the second restriction pawls 474 to make contact with the third stopper pawls 178.

According to the lock-up device 7, for the purpose of enabling function of the rotation restricting unit 80, the second restriction pawls 474 are prepared for the drive plate 72 whereas the third stopper pawls 178 are prepared for the spring holder 75. With a thus constructed lock-up device 7, the rotation restricting unit 80 can be activated without greatly modifying the device construction. Put differently, the aforementioned advantageous effect can be obtained without increasing the number of components.

In the exemplary embodiment of the lock-up device 7, the drive plate 72 has the third restriction pawls 475 formed to face the driven plate 73. The driven plate 73 has the second stopper pawls 375 with which the third restriction pawls 475 make contact. The rotation restricting unit 80 is configured to restrict and bring each first torsion spring 174b and each second torsion spring 274b to the deactivated state by causing the third restriction pawls 475 to make contact with the second stopper pawls 375 after restricting and bringing each first torsion spring 174a and each second torsion spring 274a to the deactivated state.

According to the exemplary embodiment of the lock-up device 7, for the purpose of enabling function of the rotation restricting unit 80, the third restriction pawls 475 are prepared for the drive plate 72 whereas the second stopper pawls 375 are prepared for the driven plate 73. With thus constructed lock-up device 7, the rotation restricting unit 80 can be activated without greatly modifying the device construction. Put differently, the aforementioned advantageous effect can be obtained without increasing the number of components.

In the exemplary embodiment of the lock-up device 7, each third restriction pawl 475 is configured to be disposed circumferentially between the relevant second restriction pawl 474 and the relevant second stopper pawl 375 in the condition that the second restriction pawls 474 make contact with the third stopper pawls 178. With thus constructed lock-up device 7, the rotation restricting unit 80 is capable of reliably performing the second activation restriction after performing the first activation restriction. The rotation restricting unit 80 is capable of further performing the rotation restriction in the third bent point P3B after performing the rotational restriction in the second bent point P2B.

In the exemplary embodiment of the lock-up device 7, each second torsion spring 274a exerts stiffness having a smaller magnitude than that to be exerted by each second torsion spring 274b. Further, in the rotation restricting unit 80, the spring holder 75 is configured to be engaged with the driven plate 73 when the drive plate 72 is rotated in the R1 direction. In the rotation restricting unit 80, the drive plate 72 is configured to be engaged with the spring holder 75 when the drive plate 72 is rotated in the R2 direction oriented oppositely to the R1 direction.

According to the exemplary embodiment of the lock-up device 7, for instance, when the drive plate 72 is rotated in the R1 direction under the third stage compressed state J3A, J3B, each first torsion spring 174a and each second torsion spring 274a are restricted and brought to the deactivated state by causing the spring holder 75 to be engaged with the driven plate 73. On the other hand, when the drive plate 72 is rotated in the R2 direction under the third stage compressed state J3A, J3B, each first torsion spring 174a and each second torsion spring 274a are restricted and brought to the deactivated state by causing the drive plate 72 to be engaged with the spring holder 75.

Thus, even when the respective first torsion springs 174a and 174b composing the first torsion springs 174 in each group have different magnitudes of stiffness, each first torsion spring 174a and each second torsion spring 274a can be restricted and brought to the deactivated state. Further, even when the respective second torsion springs 274a and 274b composing the second torsion springs 274 in each group have different magnitudes of stiffness, each first torsion spring 174a and each second torsion spring 274a can be restricted and brought to the deactivated state.

The aforementioned exemplary embodiment has exemplified the construction that the rotation restricting unit 80 restricts rotation in three positions. However, the number of positions for restricting rotation may be arbitrarily set as long as rotation can be reliably restricted. Generally expressed, the rotation restricting unit 80 is only required to restrict rotation in at least in one position.

The aforementioned exemplary embodiment has exemplified the construction that the stiffness in the R1-directional rotation and that in the R2-directional rotation are set to have equal magnitude. However, the rotation restricting unit 80 is similarly applicable even to a construction that stiffness in the R1-directional rotation and that in the R2-directional rotation are set to have different magnitudes.

The present invention is widely applicable to vibration reducing mechanisms.

The invention claimed is:

1. A lock-up device for transmitting torque and for absorbing and attenuating torsional vibration, comprising:
   an input rotary member;
   an output rotary member disposed to be rotatable with respect to the input rotary member;
   a plurality of groups of first elastic members, the first elastic members in each group being configured to be circumferentially compressed in series by relative rotation between the input rotary member and the output rotary member;
   a plurality of second elastic members respectively having free lengths shorter than free lengths of the first elastic members and being respectively disposed in inner peripheral parts of the first elastic members;
   a float member restricting radial movement of the plurality of groups of the first elastic members; and
   an activation restricting mechanism configured to restrict and bring one of the first elastic members in each group and the second elastic member disposed in the inner peripheral part of the one of the first elastic members in each group to a deactivated state by at least either of engagement of the float member with the output rotary member or engagement of the input rotary member with the float member.

2. The lock-up device recited in claim 1, wherein
   the float member is configured to be engaged with the output rotary member when the input rotary member is rotated in a first direction, and
   the input rotary member is configured to be engaged with the float member when the input rotary member is rotated in a second direction oriented oppositely to the first direction.

3. The lock-up device recited in claim 1, wherein
   the activation restricting mechanism is configured to restrict and bring the other of the first elastic members in each group and the second elastic member disposed in the inner peripheral part of the other of the first elastic members in each group to the deactivated state by engagement of the input rotary member with the output rotary member after restricting and bringing the one of the first elastic members and the second elastic member disposed in the inner peripheral part of the one of the first elastic members to the deactivated state.

4. The lock-up device recited in claim 1, wherein
   the float member has a first engaging part formed to face the output rotary member,
   the output rotary member has a first contact part contactable with the first engaging part, and
   the activation restricting mechanism is configured to restrict and bring the one of the first elastic members and the second elastic member disposed in the inner peripheral part of the one of the first elastic members to the deactivated state by causing the first engaging part to contact the first contact part.

5. The lock-up device recited in claim 4, wherein
   the input rotary member has a second engaging part formed to face the output rotary member,
   the output rotary member has a second contact part contactable with the second engaging part, and
   the activation restricting mechanism is configured to restrict and bring the other of the first elastic members in each group and the second elastic member disposed in the inner peripheral part of the other of the first elastic members to the deactivated state by causing the second engaging part to make contact with the second contact part after restricting and bringing the one of the first elastic members and the second elastic member disposed in the inner peripheral part of the one of the first elastic members to the deactivated state.

6. The lock-up device recited in claim 5, wherein the second engaging part is configured to be disposed circumferentially between the first engaging part and the second contact part in a condition that the first engaging part makes contact with the first contact part.

7. The lock-up device recited in claim 6, wherein
   the input rotary member has a third engaging part formed to face the float member,
   the float member has a third contact part contactable with the third engaging part, and
   the activation restricting mechanism is configured to restrict and bring the one of the first elastic members and the second elastic member disposed in the inner peripheral part of the one of the first elastic members to the deactivated state by causing the third engaging part to make contact with the third contact part.

8. The lock-up device recited in claim 7, wherein
   the input rotary member has a fourth engaging part formed to face the output rotary member,
   the output rotary member has a fourth contact part contactable with the fourth engaging part, and
   the activation restricting mechanism is configured to restrict and bring the other of the first elastic members in each group and the second elastic member disposed in the inner peripheral part of the other of the first elastic members to the deactivated state by causing the fourth engaging part to make contact with the fourth contact part after restricting and bringing the one of the first elastic members and the second elastic member disposed in the inner peripheral part of the one of the first elastic members to the deactivated state.

9. The lock-up device recited in claim 8, wherein
   the fourth engaging part is configured to be disposed circumferentially between the third engaging part and the fourth contact part in a condition that the third engaging part makes contact with the third contact part.

10. The lock-up device recited in claim 1, wherein
    the second elastic member disposed in the inner peripheral part of the one of the first elastic members exerts a stiffness having a smaller magnitude than a stiffness to be exerted by the second elastic member disposed in the inner peripheral part of the other of the first elastic members in each group,
    the float member is configured to be engaged with the output rotary member when the input rotary member is rotated in a first direction, and
    the input rotary member is configured to be engaged with the float member when the input rotary member is rotated in a second direction oriented oppositely to the first direction.

* * * * *